US012375816B2

(12) United States Patent
Takahashi

(10) Patent No.: US 12,375,816 B2
(45) Date of Patent: Jul. 29, 2025

(54) IMAGE PICKUP SYSTEM

(71) Applicant: CANON KABUSHIKI KAISHA, Tokyo (JP)

(72) Inventor: Makoto Takahashi, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 75 days.

(21) Appl. No.: 18/526,035

(22) Filed: Dec. 1, 2023

(65) Prior Publication Data
US 2024/0114248 A1    Apr. 4, 2024

Related U.S. Application Data

(63) Continuation of application No. PCT/JP2022/024897, filed on Jun. 22, 2022.

(30) Foreign Application Priority Data

Jun. 29, 2021    (JP) .................................. 2021-108082

(51) Int. Cl.
H04N 23/698    (2023.01)
B60Q 5/00    (2006.01)
(Continued)

(52) U.S. Cl.
CPC ........... *H04N 23/698* (2023.01); *B60Q 5/006* (2013.01); *B60Q 9/008* (2013.01); *H04N 25/702* (2023.01)

(58) Field of Classification Search
CPC .... H04N 23/698; H04N 25/702; B60Q 5/006; B60Q 9/008
See application file for complete search history.

(56) References Cited

U.S. PATENT DOCUMENTS 6,734,911 B1 *   5/2004   Lyons ..................... G01S 3/781
                                                         348/340
2005/0083427 A1   4/2005   Imoto
(Continued)

FOREIGN PATENT DOCUMENTS

CN    112788204 A    5/2021
JP    2005110207 A    4/2005
(Continued)

OTHER PUBLICATIONS

English translation of Written Opinion issued in Intl. Appln. No. PCT/JP2022/024897, mailed Aug. 30, 2022, previously cited in an IDS on Dec. 1, 2023.
(Continued)

*Primary Examiner* — Thai Q Tran
*Assistant Examiner* — Jose M Mesa
(74) *Attorney, Agent, or Firm* — ROSSI, KIMMS & McDOWELL LLP

(57) ABSTRACT

An image pickup system includes an image pickup apparatus mounted on a movable body. The image pickup apparatus includes an optical system and an image sensor configured to image an object via the optical system. An imaging surface of the image sensor has a first area for imaging an object included in a first angle of view, and a second area for imaging an object included in a second angle of view larger than the first angle of view. The number of pixels per unit angle of view in the second area is larger than the number of pixels per unit angle of view in the first area. In a case where the movable body moves in a horizontal direction, the image pickup apparatus is installed so that an optical axis of the optical system is nonparallel to the horizontal direction. Predetermined inequalities are satisfied.

17 Claims, 15 Drawing Sheets

(51) Int. Cl.
*B60Q 9/00* (2006.01)
*H04N 25/702* (2023.01)

(56) References Cited

U.S. PATENT DOCUMENTS

| | | | | |
|---|---|---|---|---|
| 2015/0304532 | A1* | 10/2015 | Bart | H04N 23/695 |
| | | | | 901/9 |
| 2016/0094767 | A1* | 3/2016 | Yamamoto | H04N 23/687 |
| | | | | 348/208.7 |
| 2019/0121221 | A1* | 4/2019 | Martí I Renom | G06K 7/10297 |
| 2022/0080902 | A1 | 3/2022 | Yamaguchi | |

FOREIGN PATENT DOCUMENTS

| | | | |
|---|---|---|---|
| JP | 2006224927 | A | 8/2006 |
| JP | 2013156793 | A | 8/2013 |
| JP | 2018120125 | A | 8/2018 |
| WO | 2020153317 | A1 | 7/2020 |

OTHER PUBLICATIONS

International Preliminary Report on Patentability issued in Intl. Appln. No. PCT/JP2022/024897, mailed Jan. 11, 2024. English translation provided.
International Search Report issued in Intl. Appln. No. PCT/JP2022/024897 mailed Aug. 30, 2022. English translation provided.
Written Opinion issued in Intl. Appln. No. PCT/JP2022/024897 mailed Aug. 30, 2022.

\* cited by examiner

IMAGE PICKUP SYSTEM

CROSS-REFERENCE TO RELATED APPLICATIONS

This application is a Continuation of International Patent Application No. PCT/JP2022/024897, filed on Jun. 22, 2022, which claims the benefit of Japanese Patent Application No. 2021-108082, filed on Jun. 29, 2021, which is hereby incorporated by reference herein in their entirety.

BACKGROUND

Technical Field

One of the aspects of the embodiments relates to an image pickup system including an image pickup apparatus, such as an on-board camera.

Description of Related Art

Some image pickup apparatuses using image sensors are mounted on a movable body such as an automobile and acquire image data around the movable body. By using the acquired image data, an object such as an obstacle around the movable body can be visually recognized or machine recognized. Such an image pickup apparatus is used, for example, in a so-called electronic mirror or digital mirror (referred to as an E-mirror hereinafter) that displays image data acquired by an image pickup apparatus disposed on a side surface of a vehicle body, on an on-board monitor. The E-mirror is demanded to capture a large image of a vehicle behind and also capture a large image near the front wheel.

In addition to the E-mirror, there are systems for use with image data acquired by imaging for automatic recognition, etc., and these systems are demanded to acquire image data including a large amount of information without increasing the number of image pickup apparatuses.

Japanese Patent Laid-Open No. 2006-224927 discloses an optical system having a fisheye characteristic that allows an image pickup apparatus placed on the side surface of the vehicle body to image a wide range including the rear and the vicinity of the front wheel. Japanese Patent Laid-Open No. 2018-120125 discloses an optical system having a projection characteristic that realizes two optical characteristics of a fisheye lens and a telephoto lens using a single optical system.

However, with the fisheye characteristic of the optical system in Japanese Patent Laid-Open No. 2006-224927, the imaging magnification (resolution) relative to the angle of view is constant. Therefore, it is difficult to enlarge and image the vehicle behind or the vicinity of the front wheel of the user's vehicle. The optical system in Japanese Patent Laid-Open No. 2018-120125 has a characteristic such that the central area serves as the telephoto lens and the peripheral area serves as the fisheye lens. Thus, if this optical system is directed to the rear and the vicinity of the front wheel, one of them is imaged in a large size, but the other is imaged in a small size. Thus, it is difficult to enlarge and image a plurality of objects to be imaged that exist in different directions through a single optical system.

SUMMARY

An optical system according to one aspect of the embodiment includes an image pickup apparatus mounted on a movable body. The image pickup apparatus includes an optical system and an image sensor configured to image an object via the optical system. An imaging surface of the image sensor has a first area for imaging an object included in a first angle of view, and a second area for imaging an object included in a second angle of view larger than the first angle of view. The number of pixels per unit angle of view in the second area is larger than the number of pixels per unit angle of view in the first area. In a case where the movable body moves in a horizontal direction, the image pickup apparatus is installed so that an optical axis of the optical system is non-parallel to the horizontal direction. The optical system satisfies the following conditions:

$$55° \leq \theta max$$

$$20\% < |d\theta max|$$

where $\theta max$ is a maximum half angle of view, and $d\theta max$ is a distortion amount at a position corresponding to a maximum image height of the optical system.

Further features of the disclosure will become apparent from the following description of embodiments with reference to the attached drawings.

DESCRIPTION OF THE EMBODIMENTS

Referring now to the accompanying drawings, a description will be given of embodiments according to the disclosure. Prior to a specific description of Examples 1 to 4, a description will be given of common matters to each example.

The optical system according to each example is a single optical system in which the imaging magnification (resolution) is different between the central area near the optical axis and the peripheral area outside it (on the off-axis side) and a sufficient angle of view and high resolution in the peripheral area can be realized.

In each example, resolution (mm/deg) is a length of an image height y per unit angle of view (the number of pixels of the image sensor in practical use), a projection characteristic y(θ) is a relationship between the image height y and the angle of view θ, and a maximum half angle of view is an angle formed between the optical axis of the optical system and the most off-axis principal ray.

A general fθ lens has a projection characteristic such that the resolution at each image height is constant and the image height and resolution are in a proportional relationship. On the other hand, the optical system according to each example has a projection characteristic such that the resolution of the peripheral area (second area) is higher than that of the central area (first area), and is used, for example, for an E-mirror.

Figure 12A:
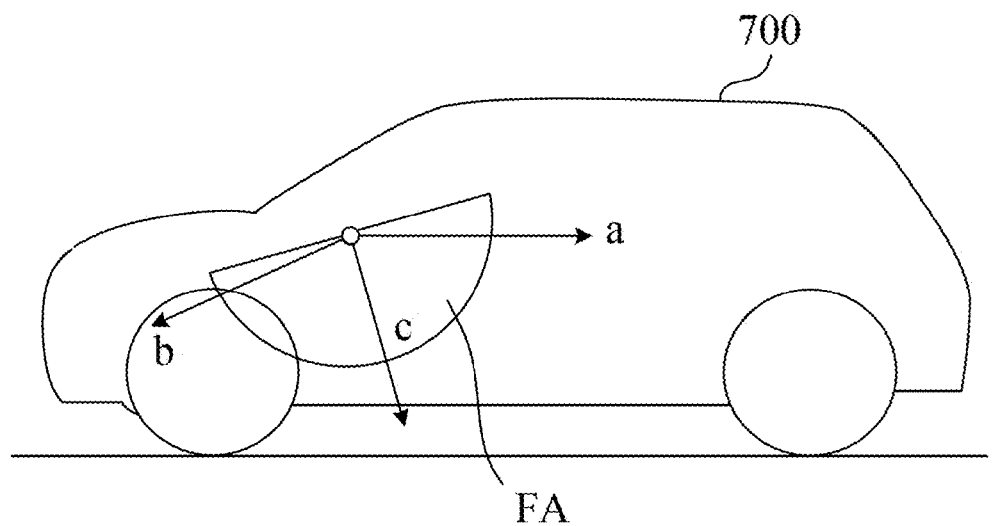
FIGS. 12A and 12B schematically illustrate the arrangement of an image pickup apparatus for an E-mirror.

FIG. 12A illustrates an image pickup apparatus for an E-mirror, disposed on the side of a vehicle body 700 of an automobile as a movable body, and using a normal fisheye lens for its optical system. The E-mirror is an image pickup system that enables the vehicle behind to be confirmed by imaging rear a, and a relationship between the front wheel and the frontage (or service) road to be confirmed by imaging lower front b. In a case where the optical system includes a fisheye lens, within an angle of view FA of the image pickup apparatus, the rear a and the lower front b are imaged with the same resolution, and lower rear c is also imaged with the same resolution as that of each of the rear a and the lower front b. Since particularly detailed information is not required for the lower rear c, imaging of the lower rear c is wasteful if its resolution is the same as that of the rear a and the lower front b.

Figure 12B:
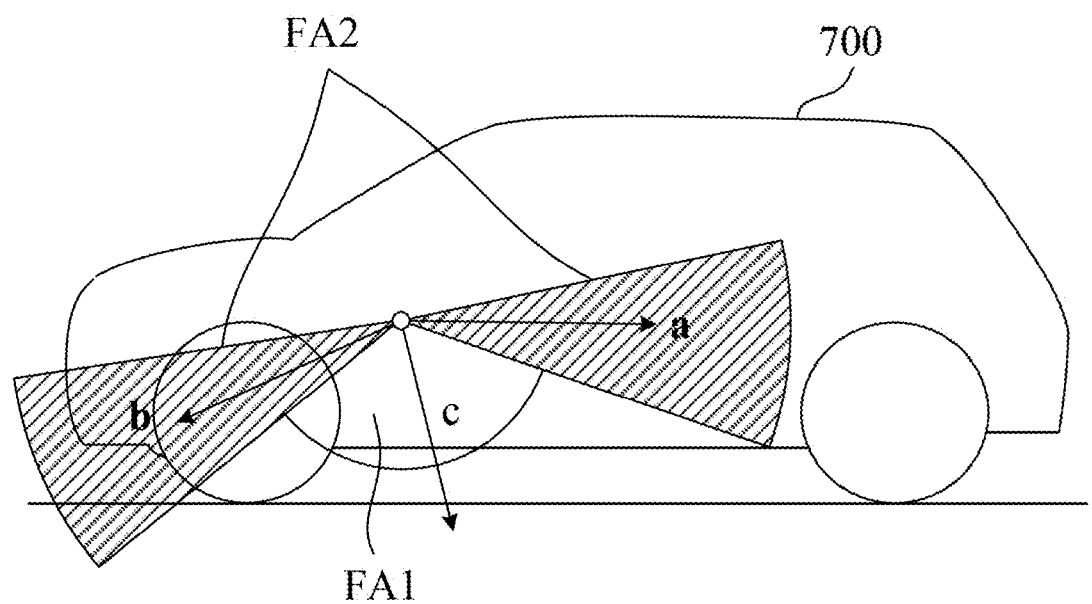

FIG. 12B illustrates an image pickup apparatus for an E-mirror, similarly disposed on the side of the vehicle body 700 and using the optical system according to each example. As described above, the optical system according to each example has a projection characteristic such that the resolution of the peripheral area FA2 is higher than that of the central area FA1 of its angle of view, and thus can perform imaging to acquire more detailed information about the rear a and the lower front b than that of the lower rear c. That is, the optical system according to each example can enlarge and image objects located in different directions, although it is a single optical system.

Figure 1:
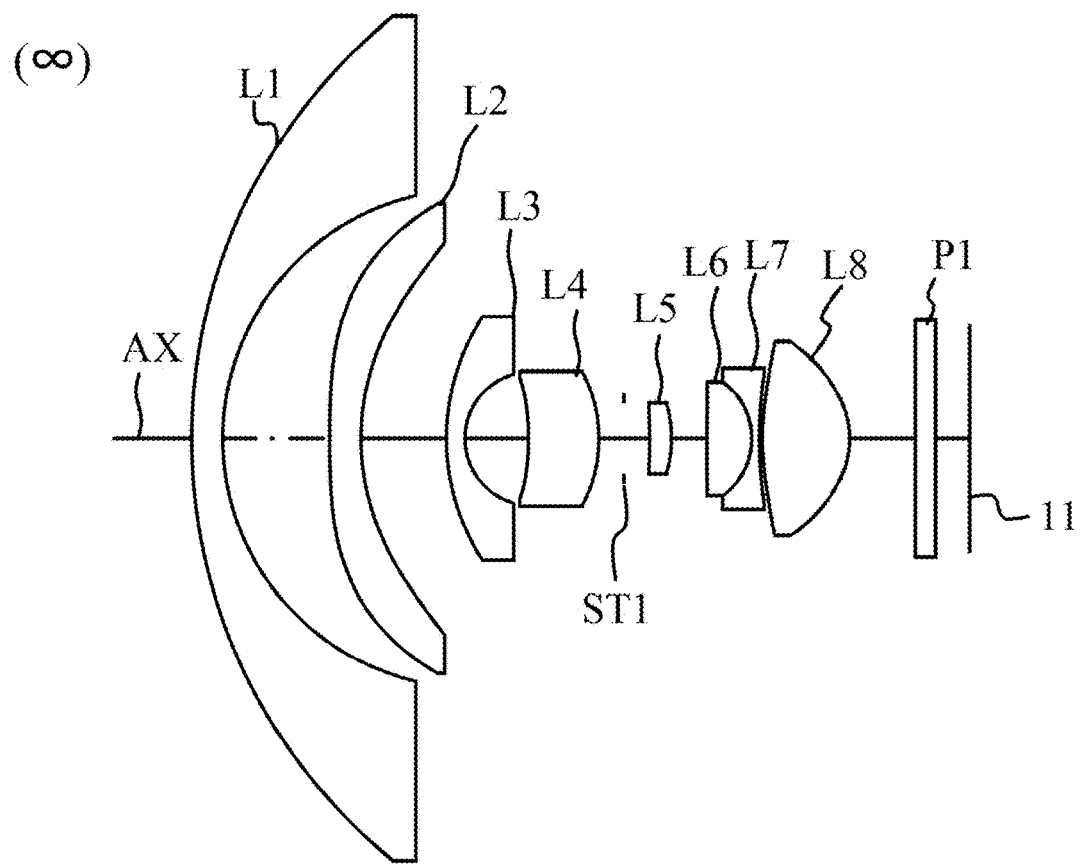
FIG. 1 is a cross-sectional view of an optical system according to Example 1.

FIG. 1 illustrates the configuration of the optical system (at an imaging distance of ∞) according to Example 1. Various specific numerical values of the optical system according to Example 1 will be described in Table 1 as numerical example 1.

The optical system according to Example 1 (numerical example 1) includes, in order from the object side (enlargement conjugate side) to the image side (reduction conjugate side), a plurality of (eight) lenses L1 to L8, and has the maximum half angle of view of 90°. The optical system according to Example 1 includes an aperture stop ST1 between the lens L4 and the lens L5. The lenses L1 to L4 constitute a front group, and lenses L5 to L8 constitute a rear group.

A flat plate P1 such as an IR cut filter is disposed between the lens L8 and the image plane. An imaging surface of an image sensor 11 such as a CMOS sensor is disposed on the image plane. The image pickup apparatus generates image data from the output of the image sensor 11.

Figure 9A:
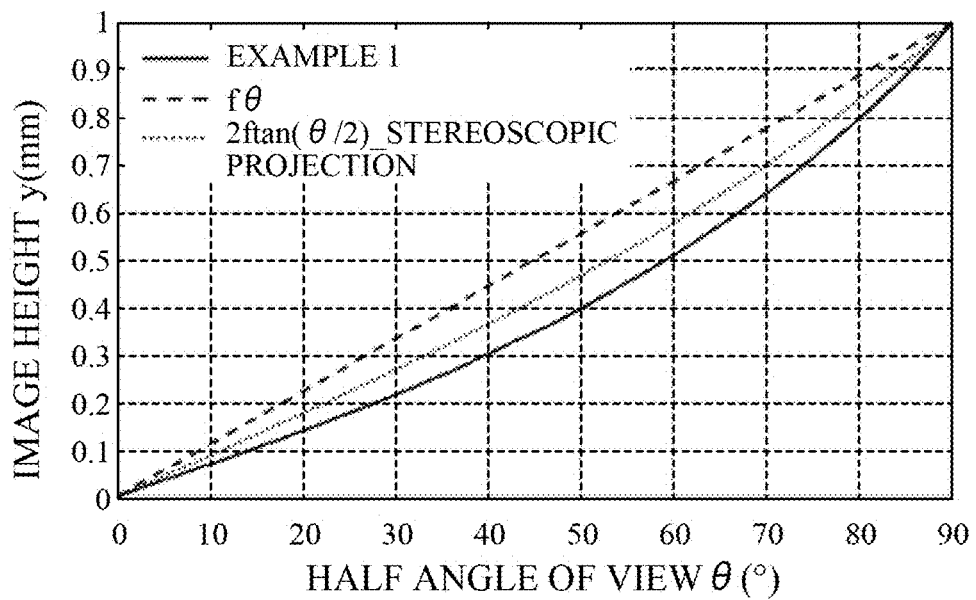
FIGS. 9A, 9B, and 9C illustrate the projection characteristics of the optical systems according to Examples 1 to 4.

FIG. 9A illustrates the θ-y projection characteristic (a relationship between the half angle of view θ and the image height y) of the optical system according to Example 1. The optical system according to Example 1 has a projection characteristic such that the increase rate (slope) of the image height y is small in the central area where the angle of view near the optical axis is small, and the increase rate of the image height y increases as the angle of view increases in the peripheral area. This projection characteristic is a projection characteristic such that the change in image height y is larger than that of each of the generally known equidistant projection (y=fθ) and the stereoscopic projection (y=2f tan(θ/2)).

In order to realize such a projection characteristic y(θ), the optical systems according to Example 1 and other examples satisfy the following inequality (1):

$$0.20 \leq 2f \tan(\theta max/2)/y(\theta max) \leq 0.95 \tag{1}$$

where θmax is the maximum half angle of view and f is a focal length.

In a case where the value of inequality (1) becomes lower than the lower limit, various aberrations such as curvature of field and distortion increase and image data with excellent image quality cannot be acquired. In a case where the value of inequality (1) becomes higher than the upper limit, a difference in resolution between the central area and the peripheral area increases, and the desired projection characteristic cannot be achieved.

Inequality (1) may be replaced with inequality (1a) as follows:

$$0.25 \leq 2f \tan(\theta max/2)/y(\theta max) \leq 0.94 \tag{1a}$$

Inequality (1) may be replaced with inequality (1b) as follows:

$$0.30 \leq 2f \tan(\theta max/2)/y(\theta max) \leq 0.80 \tag{1b}$$

Figure 10A:
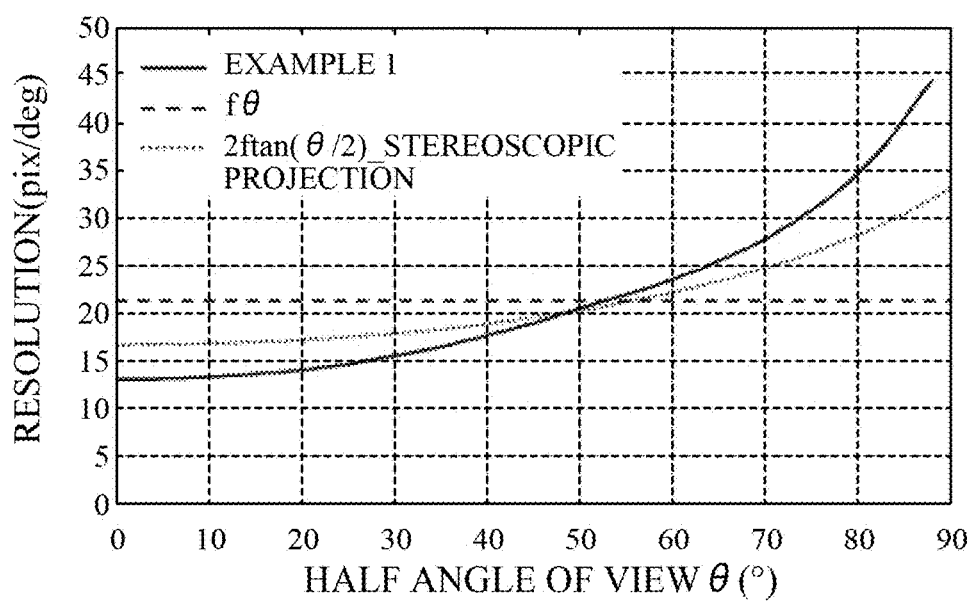
FIGS. 10A, 10B, and 10C illustrate resolution against an angle of view of the optical systems according to Examples 1 to 4.

FIG. 10A illustrates the θ-resolution characteristic of the optical system according to Example 1. This θ-resolution characteristic is illustrated for a full high-definition (1920× 1080 pixels) image sensor. As can be seen from this figure, in a case where y=fθ, the resolution is constant against the angle of view, and in a case where y=2f tan (θ/2), the resolution increases as the angle of view becomes larger.

On the other hand, in the optical system according to Example 1, the increase rate (slope) of resolution is larger than that of y=2f tan (θ/2) in the peripheral area. Thereby, a difference between the resolution of the central area and the resolution near the maximum half angle of view of the peripheral area is made larger than that of y=2f tan (θ/2).

The optical system according to each example may satisfy the following inequality (2):

$$1.35 \leq \{y(\theta max) - y(\theta_{80})\}/(f\theta_{max} - f\theta_{80}) \leq 2.50 \tag{2}$$

where $\theta_{80}$ is an angle of view of 80% of the maximum half angle of view.

Inequality (2) defines a condition regarding the resolution distribution in the peripheral area of the optical system according to each example for the fisheye lens. In a case where the value of inequality (2) becomes lower than the lower limit, various aberrations such as curvature of field and distortion increase and image data of excellent image quality cannot be obtained. In a case where the value of inequality (2) becomes higher than the upper limit, a difference in resolution between the central area and the peripheral area decreases and the desired projection characteristic cannot be achieved.

Inequality (2) may be replaced with inequality (2a) as follows:

$$1.40 \leq \{y(\theta max) - y(\theta_{80})\}/(f\theta max - f\theta_{80}) \leq 2.30 \quad (2a)$$

Inequality (2) may be replaced with inequality (2a) as follows:

$$1.44 \leq \{y(\theta max) - y(\theta 80)\}/(f\theta max - f\theta 80) \leq 2.10 \quad (2b)$$

Figure 10B:
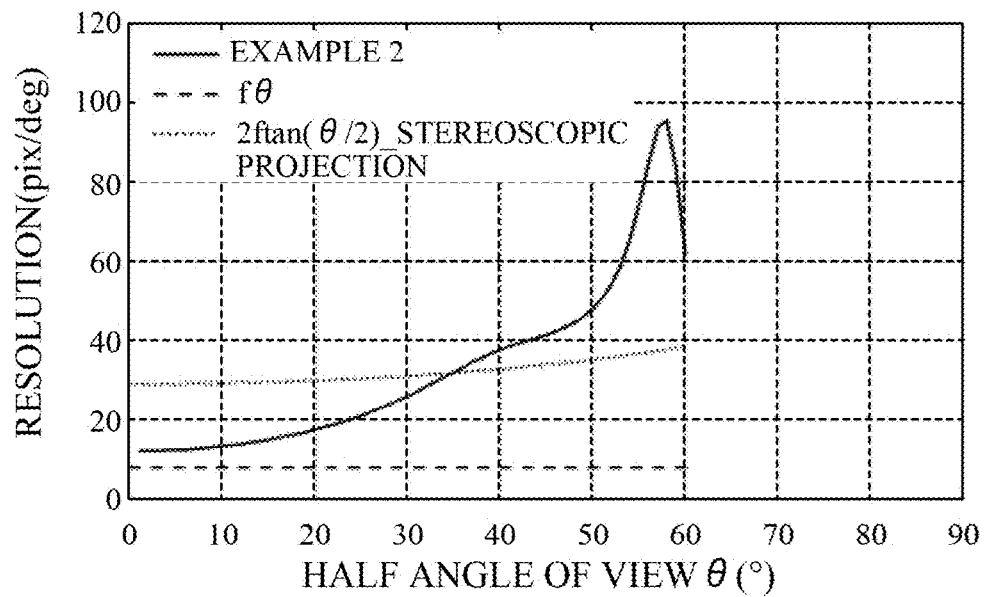
Figure 10C:
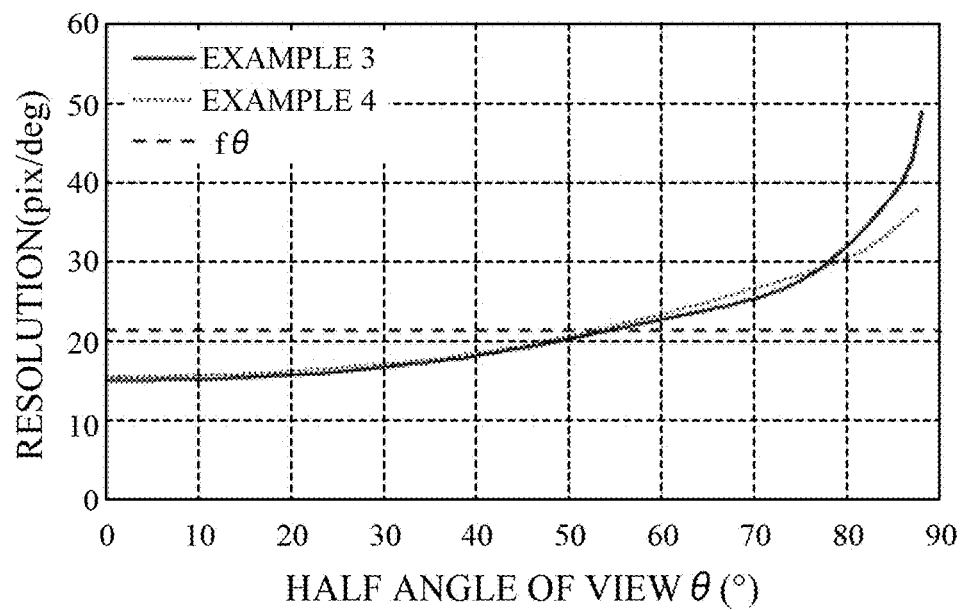

FIG. 10B illustrates a θ-resolution characteristic of the optical system according to Example 2 having a maximum half angle of view of 60°, and FIG. 10C illustrates a θ-resolution characteristics according to Examples 3 and 4 each having a maximum half angle of view of 90°. Even in the optical systems according to Examples 2 to 4, as in Example 1, the resolution increases as the angle of view increases. Example 2 makes a difference in resolution between the central area and the peripheral area larger than that in the optical systems of other examples. Thus, even if the specification, such as the maximum half angle of view, maximum image height, and Fno, changes, an optical system can be realized which has a sufficiently large angle of view and a required projection characteristic described above.

The optical system according to each example can have a better projection characteristic by satisfying the following inequality (3):

$$0.1 \leq f \sin \theta max / y(\theta max) \leq 0.8 \quad (3)$$

where f sin θ is an orthogonal projection.

In a case where the value of inequality (3) becomes lower than the lower limit, various aberrations such as curvature of field and distortion increase, image data with excellent image quality cannot be obtained. In a case where the value of inequality (3) becomes higher than the upper limit, a difference in resolution between the central area and the peripheral area decreases and the desired projection characteristic cannot be achieved.

Inequality (3) may be replaced with inequality (3a) as follows:

$$0.1 \leq f \sin \theta max / y(\theta max) \leq 0.6 \quad (3a)$$

Inequality (3) may be replaced with inequality (3b) as follows:

$$0.2 \leq f \sin \theta max / y(\theta max) \leq 0.5 \quad (3b)$$

In addition, in applications where the image pickup apparatus having the optical system according to each example is actually used, a difference in the angle of view between the central area and the peripheral area to a certain extent or more can more effectively enhance the effect of the difference in resolution between the central area and the peripheral area, and thus θmax may satisfy inequality (4) below:

$$\theta max \geq 60° \quad (4)$$

In a case where the movable body (automobile) moves in the horizontal direction, the image pickup apparatus is installed so that the optical axis of the optical system is nonparallel to the horizontal direction. In this case, the following inequalities may be satisfied:

$$55° \leq \theta max$$

$$20\% < |d\theta max|$$

where θmax is the maximum half angle of view, and dθmax is a distortion amount at a position corresponding to a maximum image height of the optical system.

The optical system according to each example has an optical configuration that can control distortion and curvature of field in order to realize the desired projection characteristic. More specifically, at least one aspherical surface is disposed on at least one of the lenses L1 and L2, which have a high off-axis ray height. At least one aspherical surface is disposed on at least one of the lens L7 and lens L8 on the image side. Due to these aspheric surfaces, distortion and curvature of field can be effectively controlled.

Figure 11A:
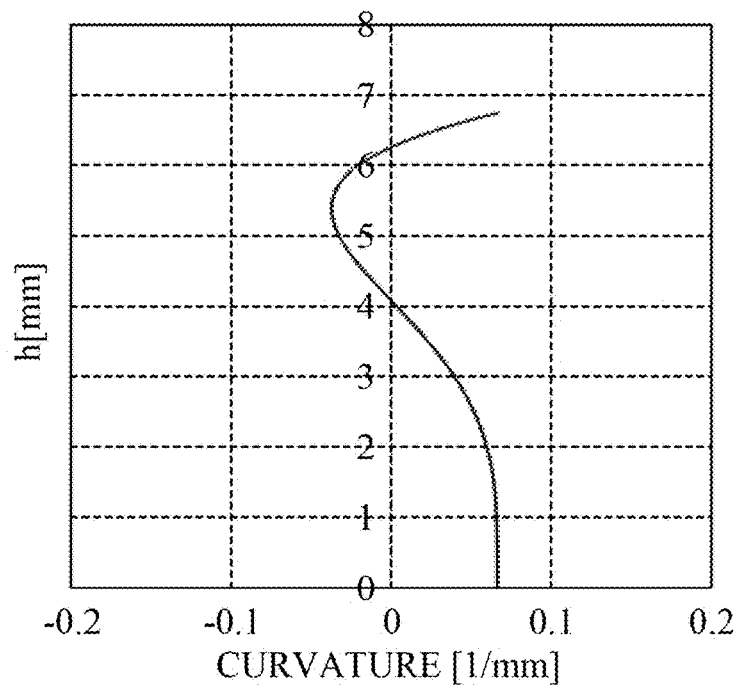
FIGS. 11A and 11B illustrate changes in the curvature of an aspheric surface of the optical system according to Example 4.
Figure 11B:
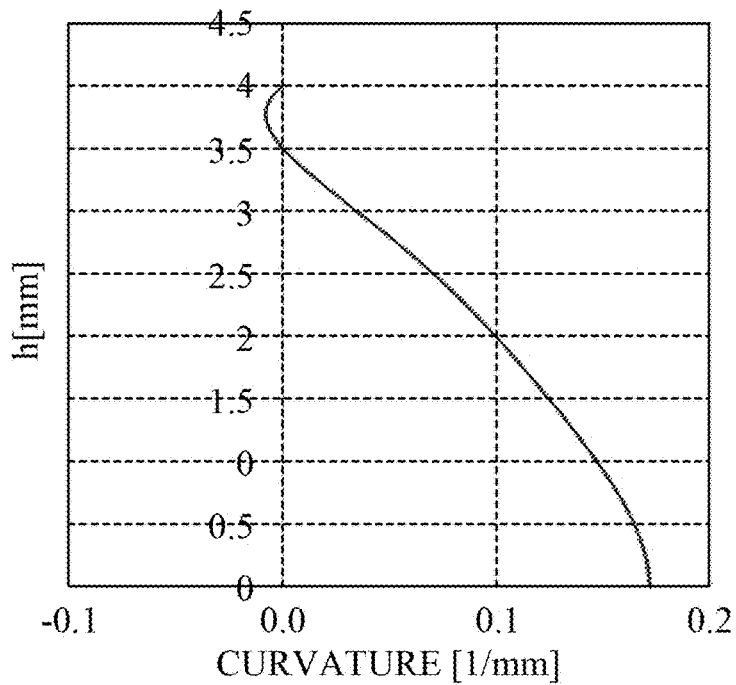

The aspherical surface having a shape including an inflection point can more effectively realize the desired projection characteristic. The inflection point referred to here is a position where the positive/negative sign of the curvature switches (inverts). More specifically, FIGS. 11A and 11B illustrate a height h (vertical axis) and curvature (horizontal axis) of the aspheric surfaces (third and fifteenth surfaces) provided in the optical system according to Example 4 in the radial direction from the optical axis. The third surface is the object-side surface of the lens L2, and the fifteenth surface is the object-side aspheric surface of the lens L8. These aspheric surfaces have an inflection point in the radial direction, which is a position where the sign of the curvature is inverted.

In order to achieve the desired projection characteristic described above, the aspheric surface on the object side may have a plurality of inflection points. In the third surface illustrated in FIG. 11A, the curvature from the optical axis (h=0 mm) to the inflection point near the paraxial h=4.0 mm is positive, the curvature from this inflection point to an inflection point near the off-axis point h=6.5 is negative, and the curvature beyond it toward the periphery is positive. That is, the third surface has a convex shape toward the object side on the paraxial side, gradually changes to a concave shape toward the object side, and changes again to a convex shape toward the object side. By providing the aspherical surface with a plurality of inflection points in this manner, the desired projection characteristic can be effectively realized.

In order to realize the desired projection characteristic, wide angle of view, and high image quality described above, the optical system may include, in order from the object side to the image side, a first lens having negative refractive power, a second lens having negative refractive power, a third lens having negative refractive power, an aperture stop, and a lens having positive refractive power and disposed closest to the image plane. For example, in the optical system according to Example 1, the lens L1 has negative refractive power, the lens L2 has negative refractive power, the lens L3 has negative refractive power, and the lens L4 has positive refractive power. Furthermore, the aperture stop ST1 is provided between the lens L4 and the lens L5, and the lens L5 has positive refractive power, the lens L6 has positive refractive power, the lens L7 has negative refractive power, and the lens L8 has positive refractive power.

In such a refractive power arrangement, satisfying at least inequality (1) described above (and inequalities (2) to (4)) can provide an optical system that can secure a sufficient angle of view, sufficient resolution in the central area, and higher resolution in the peripheral area even with a single optical system, and have excellent optical performance over the entire angle of view.

In particular, making the three lenses from the object side negative lenses can bend the light ray at the peripheral angle of view in stages and suppress various aberrations such as excess distortion and curvature of field.

Making the lens closest to the image plane a positive lens can make gentle the angle of the light ray incident on the image sensor and secure a sufficient light amount captured by the image sensor.

In order to realize the desired projection characteristic and high image quality, the optical system may include, in this order from the object side to the image side, a first lens having negative refractive power, a second lens having negative refractive power, a third lens having negative refractive power, a fourth lens having positive or negative refractive power, an aperture stop, a fifth lens having positive refractive power, a sixth lens having negative refractive power, a seventh lens having positive refractive power, and an eighth lens having positive refractive power.

Examples 1 to 4 illustrate representative configuration illustrations of each example, and the examples include other configuration illustrations. For example, the projection characteristic and the positions and numbers of inflection points on the aspheric surface are not limited to those in Examples 1 to 4.

A description will now be given of an E-mirror as an image pickup system including an image pickup apparatus for the E-mirror using the optical system according to each example. The image pickup apparatus is installed on the side of the vehicle body 700, as illustrated in FIG. 12B, and images an object at the rear and lower side in the vertical direction (directly below and lower front side).

The image pickup apparatus includes an optical system according to each example configured to form an object image, and an image sensor configured to photoelectrically convert the object image (to image the object via the optical system). A plurality of pixels two-dimensionally arranged are provided on the imaging surface of the image sensor.

Figure 15A:
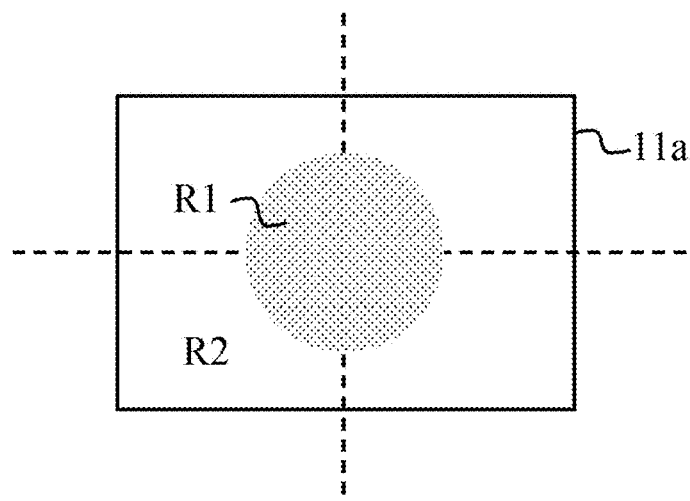
FIGS. 15A, 15B, and 15C explaining an image sensor.

An imaging surface 11a on the image sensor illustrated in FIG. 15A has a first area R1 for imaging an object included in the central area (first angle of view) among angles of view of the optical system, and a second area R2 for imaging the object included in a peripheral area (second angle of view larger than the first angle of view). The optical system has a projection characteristic such that the number of pixels per unit angle of view in the second area R2 is larger than the number of pixels per unit angle of view in the first area R1. That is, in a case where the resolution is defined as the number of pixels per unit angle of view, the image pickup apparatus is configured such that the resolution of the peripheral area is higher than the resolution of the central area.

Figure 14A:
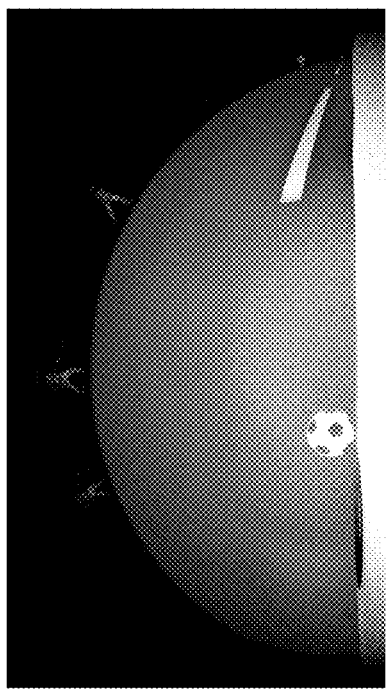
FIGS. 14A and 14B illustrate simulation results of images acquired using an fθ lens and the optical systems according to Examples 1 to 4.
Figure 14B:
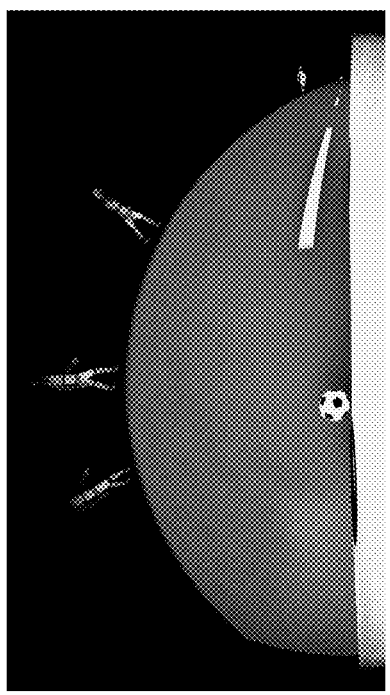
Figure 14B:
Figure 14B:
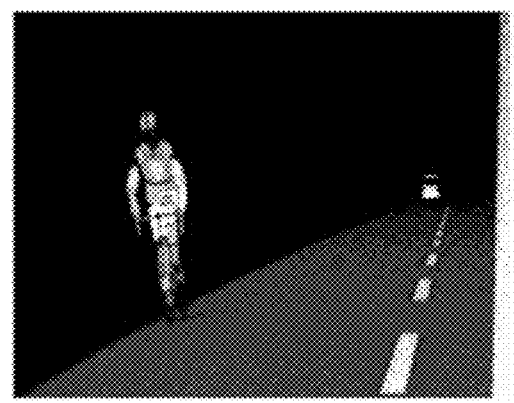

FIG. 14A illustrates a simulation result of image data (captured image) obtained by an image pickup apparatus for an E-mirror using an fθ lens as an optical system. FIG. 14B illustrates a simulation result of a captured image obtained by an image pickup apparatus for an E-mirror using the optical system according to each example. In each figure, the upper side illustrates the rear of the vehicle body, the right side illustrates the vicinity of the side surface of the vehicle body, the lower right side illustrates the vicinity of the front wheel, and the left side illustrates the side of the vehicle body. FIG. 14B also illustrates an enlarged image of the rear portion of the captured image.

In FIG. 14B, in comparison with FIG. 14A, a bicycle and vehicle behind are enlarged and captured in a large size. Therefore, detailed information about the rearview can be obtained from the captured image, and visibility as an E-mirror can be improved and recognition accuracy in automatic recognition can be improved.

Figure 13A:
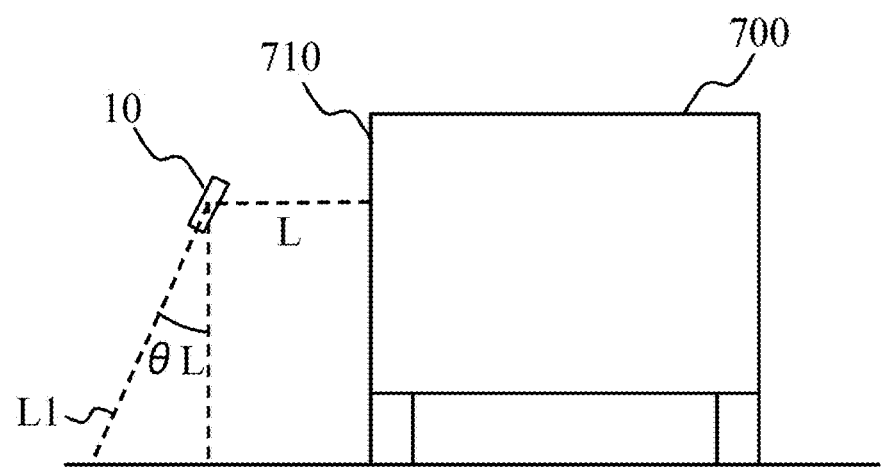
FIGS. 13A, 13B, and 13C illustrate the arrangement of the image pickup apparatus for the vehicle body.

In order to realize such an E-mirror, the image pickup apparatus 10 is disposed as illustrated in FIGS. 12B and 13A. FIG. 13A illustrates the vehicle body 700 viewed from the front in the horizontal direction (front-back direction) as the moving direction (first direction) of the vehicle body 700. The lower part of FIG. 13A is the vertical direction (second direction) orthogonal to the horizontal direction, and the left direction is the side (third direction) orthogonal to the horizontal direction and the vertical direction.

The image pickup apparatus 10 is located on the side of the vehicle body 700 (portion facing the third direction), at a position distant by distance L from the vehicle body side surface 710 laterally (in the third direction), as illustrated in FIG. 13A. As illustrated in FIG. 12B, the image pickup apparatus 10 is installed so that the optical axis AX faces diagonally downward from the rear (road surface side), that is, toward the rear downward direction c.

Further, the image pickup apparatus 10 is installed so that an optical axis L1 (AX) is tilted by an angle θL relative to the vertical direction (second direction) when the vehicle body 700 moving in the horizontal direction is viewed from the front, as illustrated in FIG. 13A. More specifically, the image pickup apparatus 10 may be installed so as to satisfy the following inequality (5):

$$0° \leq \theta L \leq 90° \tag{5}$$

where θL larger than 0° indicates a slope angle of the optical axis AX to the side away from the vehicle body side surface 710 toward the side direction with respect to the vertical direction.

Figure 16A:
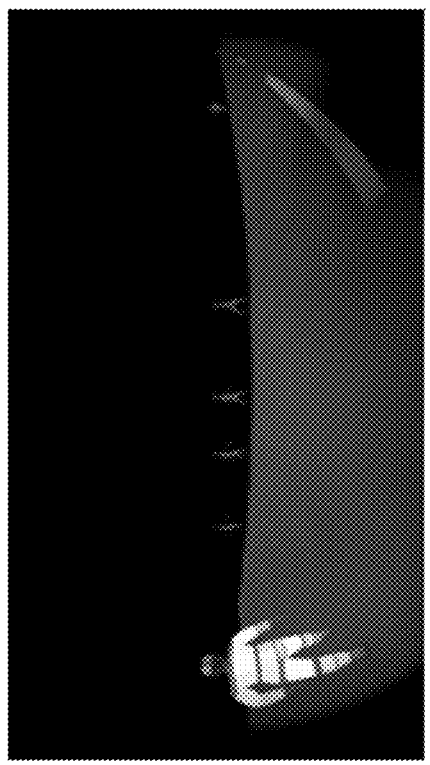
FIGS. 16A, 16B, 16C, and 16D illustrate simulation results for various parameters.

FIG. 16A illustrates a simulation result of a captured image where θL is 90°. In this case, the lanes on the road surface are not imaged along the sides of the imaging surface of the image sensor, a captured image is difficult to intuitively recognize for the driver, but the image that can be easily recognized can be generated by performing image processing such as distortion correction.

Inequality (5) may be replaced with inequality (5a) as follows:

$$0° \leq \theta L \leq 20° \tag{5a}$$

Figure 16B:
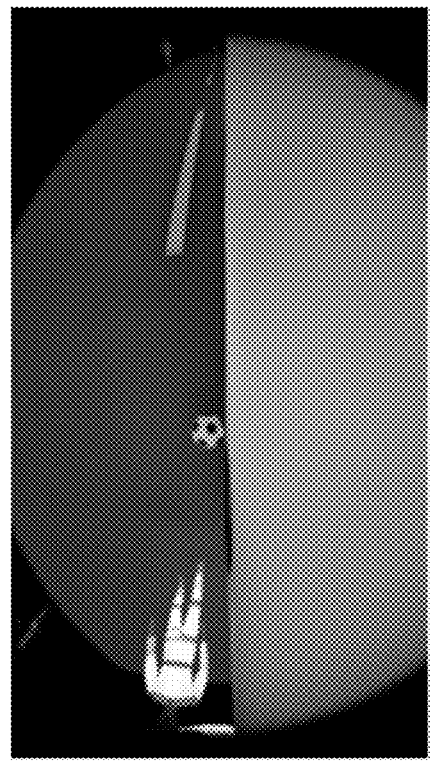

FIG. 16B illustrates a simulation result of a captured image where θL is 0°. In this case, since the lanes are imaged along the sides of the imaging surface and a captured image is easy to visually recognize in a straight line, image processing such as distortion correction is unnecessary. Therefore, high-response imaging can provide a captured image with high real-time performance with a simple configuration. Further, in this case, since the side surface of the user's vehicle can also be imaged, a captured image can be provided in which a distance between the side surface of the user's vehicle and the obstacle can be easily recognized. A similar captured image can also be obtained in a case where θL is greater than 0° and less than 20°.

Figure 15B:
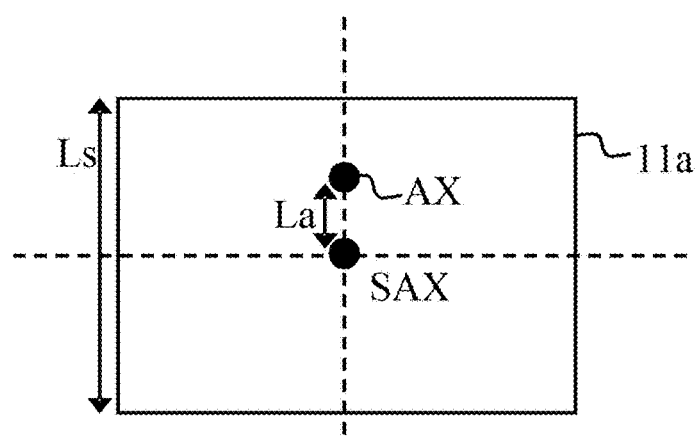

The optical system may be disposed so that the optical axis AX is shifted away from the side surface of the vehicle body with respect to the center of the imaging surface 11a (referred to as a sensor center hereinafter) SAX, as illustrated in FIG. 15B. Thereby, a captured image can be obtained with higher visibility, as illustrated in FIG. 16C.

Figure 16C:
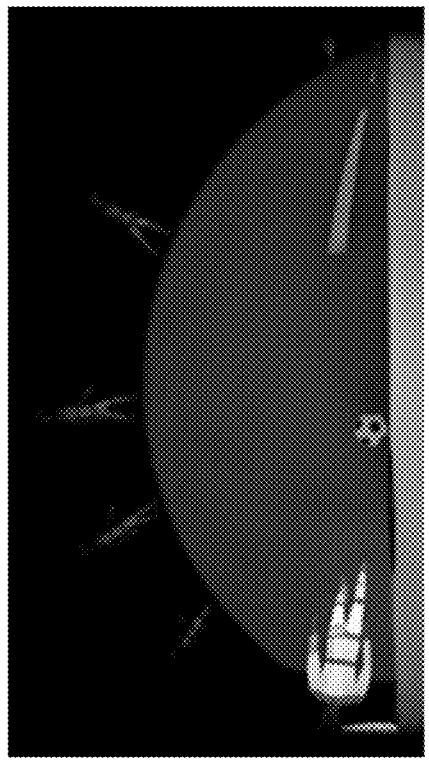

FIG. 16C illustrates a captured image where the optical axis AX is shifted in a direction separating from the vehicle body side surface with respect to the sensor center SAX. In comparison with the captured image illustrated in FIG. 16B where the optical axis AX and the sensor center SAX coincide with each other, this captured image has a minimum necessary area for illustrating the side surface of the user's vehicle and illustrates a wide range of an object on the side of the vehicle body.

The shift amount (shifted amount) La of the optical axis AX from the sensor center SAX may satisfy the following inequality (6):

$$0.3 Ls \leq La \leq 0.5 Ls \tag{6}$$

where Ls is a length of a side extending from the sensor center SAX on the imaging surface 11a toward the optical axis AX.

Figure 13B:
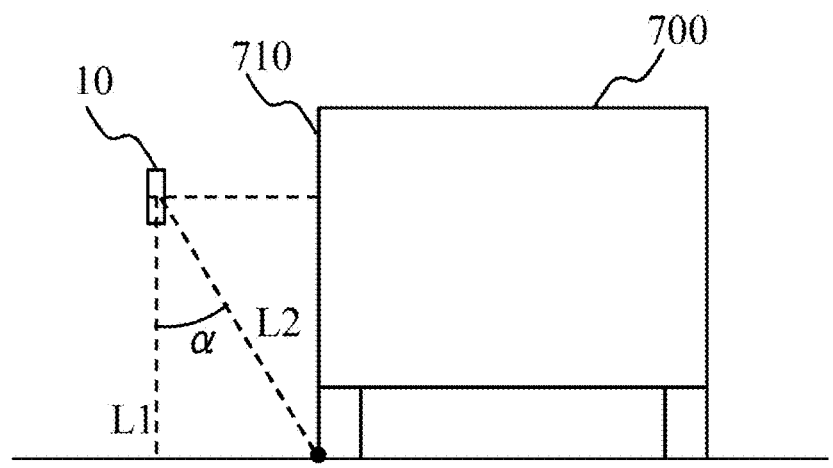

As illustrated in FIG. 13B, in a case where the vehicle body 700 moving in the horizontal direction is viewed from the front, the image pickup apparatus 10 is installed so that the optical axis L1 of the optical system is parallel to the vertical direction. The image pickup apparatus 10 is installed away from the vehicle body side surface 710. At this time, the shift amount La may satisfy the following inequality (7):

$$0.3Ls \leq La + y\alpha \leq 0.5Ls \tag{7}$$

where α is an angle formed between the optical axis L1 (AX) of the optical system and a straight line (first straight line) L2 that connects an intersection of the surface of the optical system closest to the object and the optical axis L1 (AX), and an endpoint of the vehicle body side surface 710 in the vertical direction (ground point of the front wheel), when the vehicle body 700 is viewed from the front. Moreover, yα is a distance from the intersection of the straight line L2 and the imaging surface to the optical axis L1. Proper imaging can be performed even if the image pickup apparatus 10 is installed at an arbitrary distance from the vehicle body side surface within a range that satisfies inequality (7).

Figure 13C:
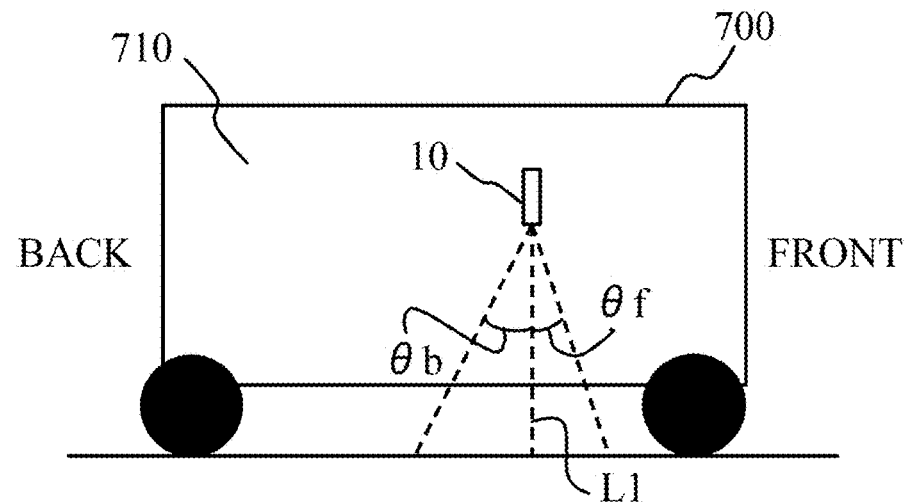

FIG. 13C illustrates an installation angle of the image pickup apparatus 10 relative to the vehicle body 700. When the vehicle body 700 is viewed from the side, θb is a slope angle of the image pickup apparatus 10 (optical axis L1 of the optical system) toward the rear relative the vertical direction, and θf is a tilt angle toward the front. The tilt angle θf is an angle between the optical axis L1 and a straight line that connects an intersection of the surface closest to the object of the optical system of the image pickup apparatus 10 and the optical axis L1, and an endpoint of the front wheel of the vehicle body 700 in the peripheral area of the angle of view (second angle of view) in the moving direction. At this time, the following inequality (8) or (9) may be satisfied:

$$0.7\theta max \leq \theta b < \theta max \tag{8}$$

$$0.7\theta max \leq \theta f < \theta max \tag{9}$$

In order to satisfy inequality (8) or (9) for objects at the rear and lower front, the optical axis L1 is tilted from the horizontal direction toward the vertical direction to face the lower rear or lower front. Setting the horizontal installation angle (orientation of the optical axis) of the image pickup apparatus 10 so as to satisfy inequality (8) or (9) can image objects in different directions at the rear and lower front with sufficient resolution and in a proper area on the imaging surface.

Since a target (of interest) of the movable body is often an object behind, the optical axis L1 may be tilted backward, that is, satisfy inequality (8). Inequality (8) can be replaced with inequality (8a) below:

$$\theta max < \theta f \leq 1.3\theta max \tag{8a}$$

Figure 16D:
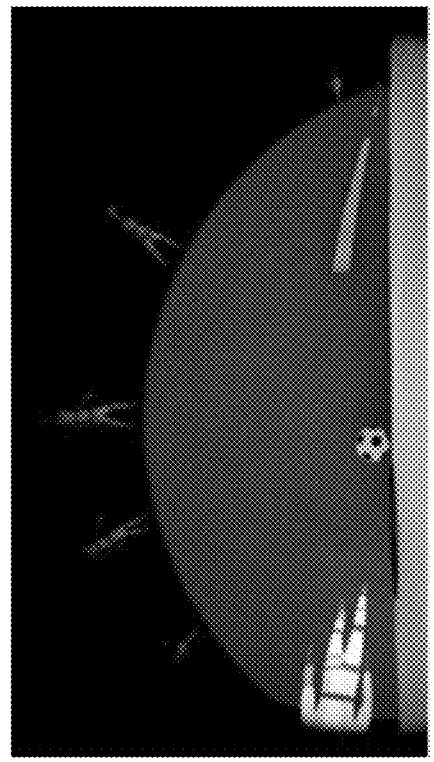

FIG. 16D illustrates a simulation result of a captured image where θb=0.95θmax (θf=1.05θmax). The area around the front wheel is illustrated at sufficient resolution in the lower part of the center area, and a vehicle behind as a main object is illustrated at higher resolution in the peripheral area.

Regarding the peripheral area of the imaging surface on the image sensor, Lb is a distance between an image position (image point) of an object behind on the imaging surface and the sensor center SAX, Lf is a distance between an image position of an object at the lower front on the imaging surface and the sensor center SAX, and Lh is a length of a side extending in a direction in which these two image positions are separated on the imaging surface. In other words, when the vehicle body 700 is viewed from the side, Lf is a distance between the image point of the endpoint (front endpoint) of the front wheel of the vehicle body 700 in the moving direction in the peripheral area of the angle of view (second angle of view) and the sensor center SAX, and Lf is a length of the side of the imaging surface extending in a direction from the sensor center SAX to the image point of the front endpoint. At this time, at least one of the following inequalities (10) and (11) may be satisfied:

$$0.35Lh \leq Lb < 0.5Lh \tag{10}$$

$$0.35Lh \leq Lf < 0.5Lh \tag{11}$$

Figure 15C:
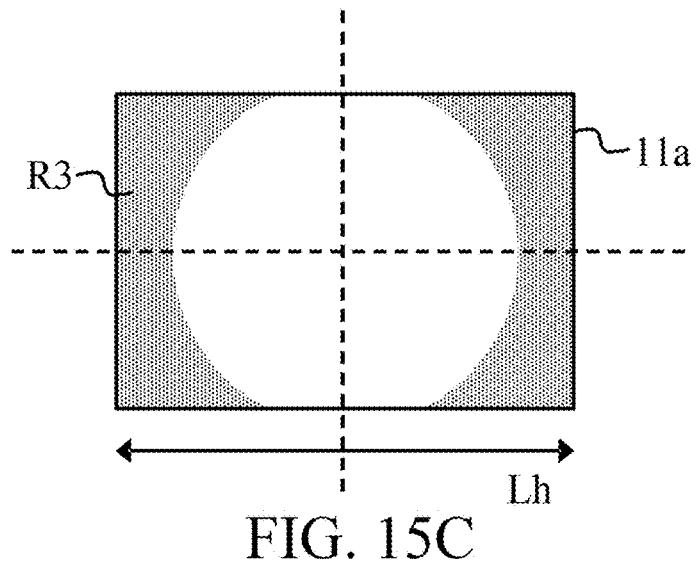

Inequalities (10) and (11) define conditions for effectively using the most peripheral area R3 of the imaging surface 11a, as illustrated in FIG. 15C. Unless these conditions are satisfied, high-resolution imaging in the most peripheral area R3 is unavailable and it becomes difficult to obtain detailed information from the captured image. In other words, satisfying at least one of inequalities (10) and (11) can provide high-resolution imaging in the most peripheral area R3. Then, cutting out a high-resolution partial image obtained in the most peripheral area R3 and outputting it to the vehicle body monitor (display unit) for display can provide the driver with detailed information about the rear. Since a target of the movable body is often an object in a back, inequality (10) may be satisfied. Inequality (11) can be replaced with inequality (11a) below:

$$0.5Lh < Lf \leq 0.65Lh \tag{11a}$$

The image pickup system described above is merely illustrative, and other configurations and arrangements may be adopted. For example, in an E-mirror, the optical axis of an image pickup apparatus installed on the side of the vehicle body is tilted from the horizontal direction (moving direction) to the vertical direction orthogonal to it to image the rear or lower front side. On the other hand, an image pickup apparatus may be installed at the front or rear of the vehicle body, and the optical axis may be tilted toward the side orthogonal to the horizontal direction to image the front and sides or the rear and sides.

An image pickup system configured similarly to the E-mirror may be installed in a movable body other than an automobile, such as an aircraft or a ship.

A specific description will now be given of the optical systems according to Examples 1 to 4.

Example 1

As described above, the optical system according to Example 1 illustrated in FIG. 1 includes, in order from the object side to the image side, a first lens L1 having negative refractive power, a second lens L2 having negative refractive power, a third lens L3 having negative refractive power, a fourth lens L4 having positive refractive power, an aperture stop ST1, a fifth lens L5 having positive refractive power, a sixth lens L6 having positive refractive power, a seventh lens L7 having negative refractive power, and an eighth lens L8 having positive refractive power.

(A) lens configuration of numerical example 1 corresponding to this example illustrated in Table 1 illustrates a focal length f (mm), an aperture ratio (F number) F, and a maximum half angle of view (°) of the optical system. ri represents a radius of curvature (mm) of the i-th surface counted from the object side, di represents a lens thickness or air gap (mm) between i-th and (i+1)-th surfaces, and ni represents a refractive index for the d-line of an optical material between i-th and (i+1)-th surfaces. vi is an Abbe number based on the d-line of the optical material between i-th and (i+1)-th surfaces.

The Abbe number vd is expressed as vd=(Nd−1)/(NF−NC), where Nd, NF, and NC are refractive indices for the d-line (587.6 nm), F-line (486.1 nm), C-line (656.3 nm) in the Fraunhofer line, respectively.

ST represents an aperture stop. "*" means that a surface to which it is attached is an aspherical surface. The aspherical shape is expressed by the following equation, where z is a coordinate in the optical axis direction, y is a coordinate in a direction orthogonal to the optical axis, a light traveling direction is set positive, ri is a paraxial radius of curvature, K is a conic constant, and A to G are aspheric coefficients. (B) aspherical coefficient in Table 1 indicates the conic constant K and the aspherical coefficients A to G. "E±−x" means×10$^{-x}$.

$$z(y)=(y^2/ri)/[1+\{1-(1+K)(y^2/ri^2)\}^{1/2}]\pm Ay^4+By^6+Cy^8+Dy^{10}+Ey^{12}+Fy^{14}+Gy^{16}$$

A description regarding a numerical example is similarly applied to numerical examples corresponding to other examples described below.

The optical system according to this example (numerical example 1) satisfies inequalities (1) to (4). Table 5 summarizes the values for each inequality.

Figure 2:
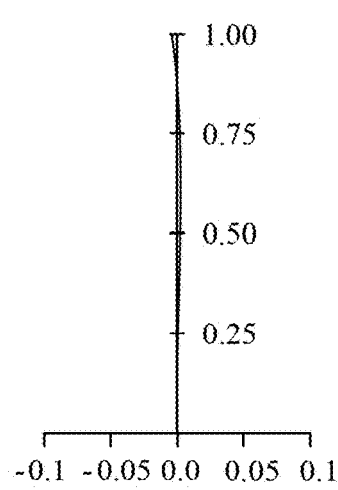
FIG. 2 is an aberration diagram at an imaging distance of co of the optical system according to Example 1.
Figure 2:
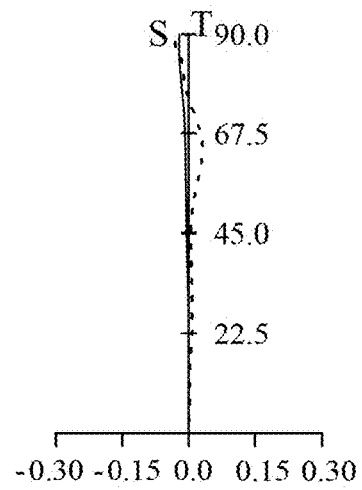
Figure 2:
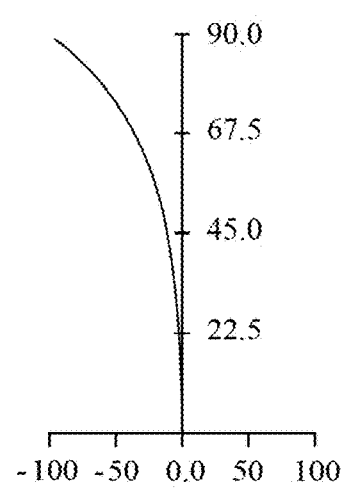

FIG. 2 illustrates longitudinal aberrations (spherical aberration, astigmatism, and distortion) at the imaging distance of ∞ of the optical system according to this example (numerical example 1). In the spherical aberration diagram, a solid line indicates the spherical aberration for the d-line (wavelength 587.6 nm). In the astigmatism diagram, a solid line S indicates a sagittal image plane, and a broken line T indicates a meridional image plane. In the distortion diagram, a solid line indicates the distortion for the d-line. A description of these aberration diagrams is similarly applied to the aberration diagrams of other examples described below.

As described above, FIG. 9A illustrates the projection characteristic of the optical system according to this example, and FIG. 10A illustrates the θ-resolution characteristic of the optical system according to this example.

Example 2

Figure 3:
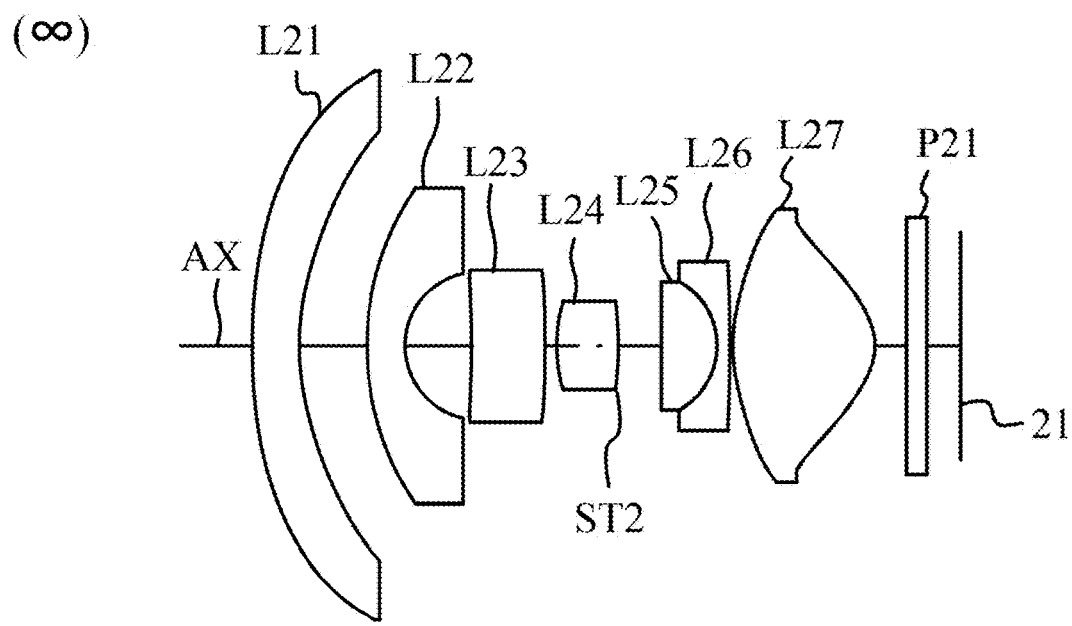
FIG. 3 is a cross-sectional view of an optical system according to Example 2.

FIG. 3 illustrates the configuration of an optical system (imaging distance of cc) according to Example 2. The optical system according to this example includes, in order from the object side to the image side, a first lens L21 having negative refractive power, a second lens L22 having negative refractive power, a third lens L23 having negative refractive power, a fourth lens L24 having positive refractive power, an aperture stop ST2, a fifth lens L25 having positive refractive power, a sixth lens L26 having negative refractive power, and a seventh lens L27 having positive refractive power. In FIG. 3, P21 denotes a flat plate such as an IR cut filter, and reference numeral 21 denotes an image sensor.

As can be seen from numerical example 2 corresponding to this example illustrated in Table 2, the maximum half angle of view θmax of the optical system according to this example is 60°, which is different from 90° of the optical system according to Example 1.

The optical system according to this example (numerical example 2) satisfies inequalities (1) to (4). Table 5 summarizes the values for each inequality.

Figure 4:
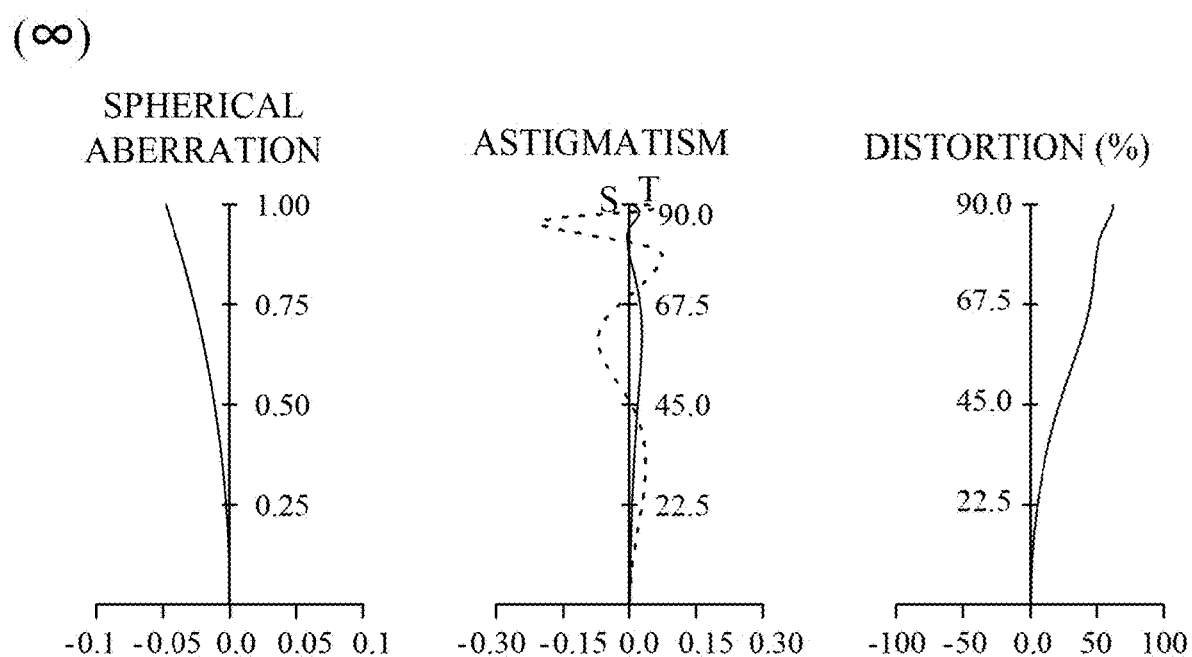
FIG. 4 is an aberration diagram at an imaging distance of co of the optical system according to Example 2.
Figure 9B:
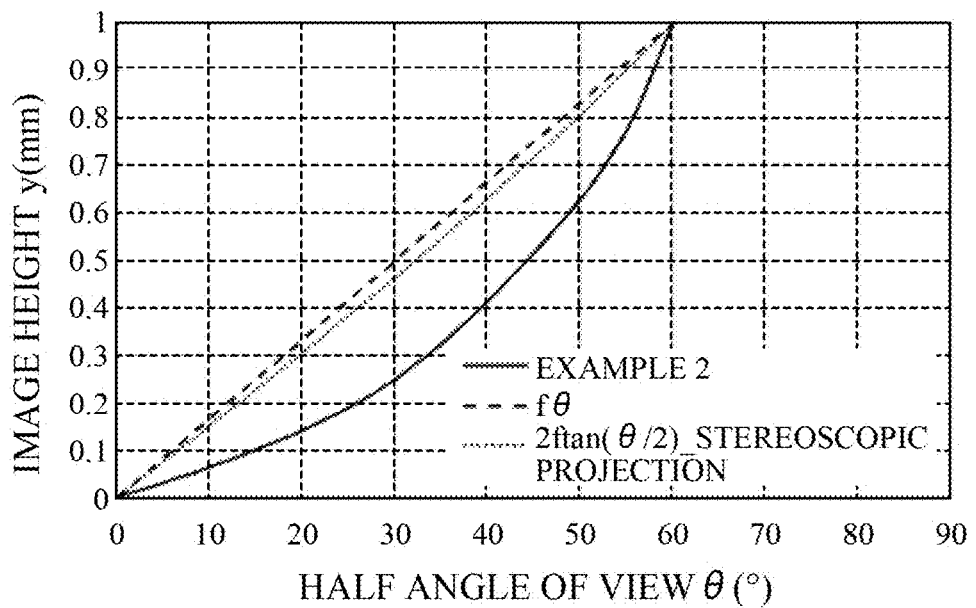

FIG. 4 illustrates the longitudinal aberration at the imaging distance of cc of the optical system according to this example (numerical example 2). FIG. 9B illustrates the projection characteristic of the optical system according to this example, and as described above, and FIG. 10B illustrates the θ-resolution characteristic of the optical system according to this example.

Example 3

Figure 5:
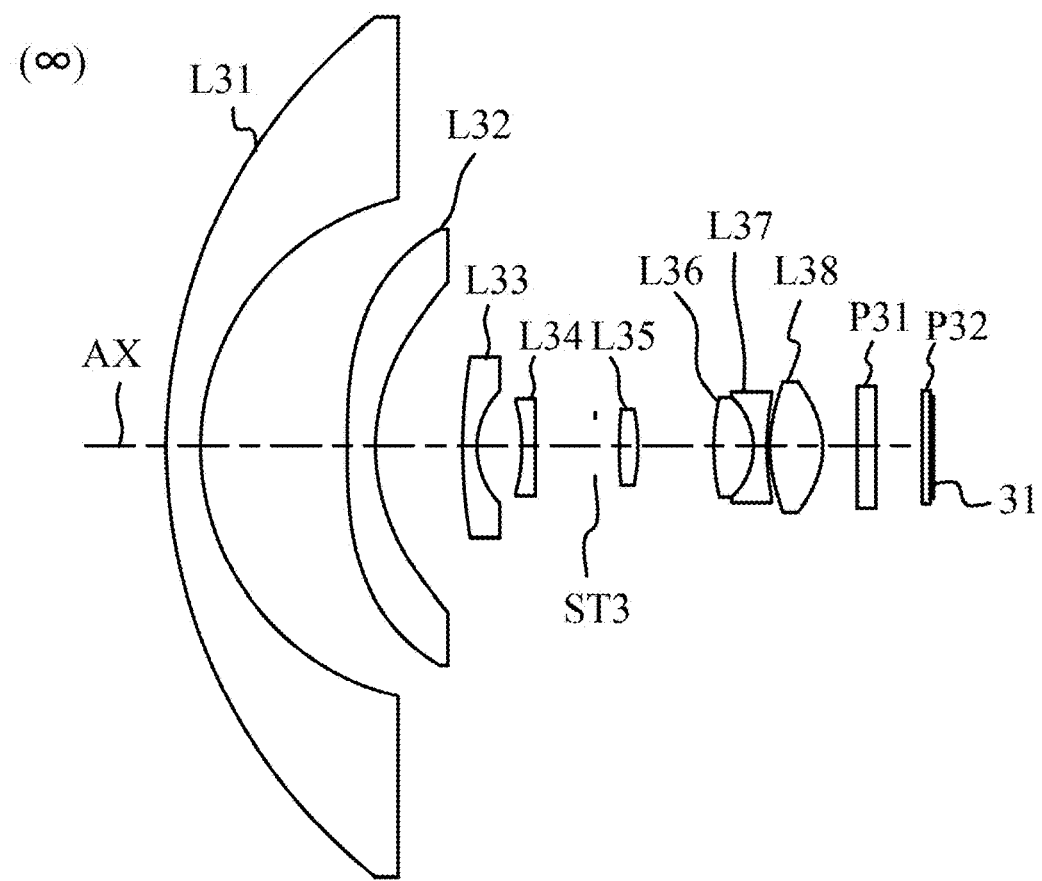
FIG. 5 is a cross-sectional view of an optical system according to Example 3.

FIG. 5 illustrates the configuration of an optical system (imaging distance of cc) according to Example 3. The optical system according to this example includes, in order from the object side to the image side, a first lens L31 having negative refractive power, a second lens L32 having negative refractive power, a third lens L33 having negative refractive power, a fourth lens L34 having negative refractive power, an aperture stop ST3, a fifth lens L35 having positive refractive power, a sixth lens L36 having positive refractive power, a seventh lens L37 having negative refractive power, and an eighth lens L38 having positive refractive power. In FIGS. 5, P31 and P32 denote flat plates such as IR cut filters, and reference numeral 31 denotes an image sensor.

As can be seen from numerical example 3 corresponding to this example illustrated in Table 3, the optical system according to this example has a maximum half angle of view of 90°, which is the same as Example 1, and a height y (θmax) of 1.79 mm, which is different from Example 1 (3.64 mm)

The optical system according to this example (numerical example 3) satisfies inequalities (1) to (4). Table 5 summarizes the values for each inequality.

Figure 6:
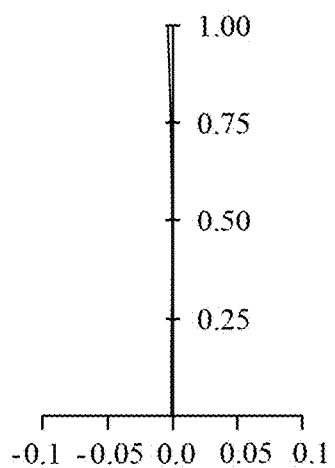
FIG. 6 is an aberration diagram at an imaging distance of co of the optical system according to Example 3.
Figure 6:
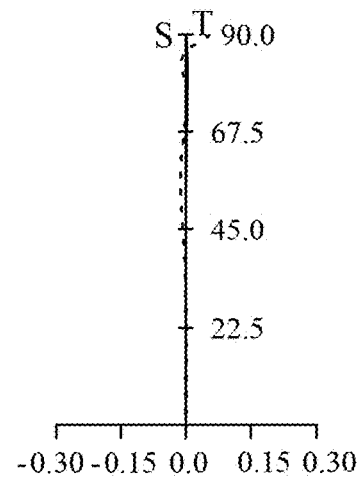
Figure 6:
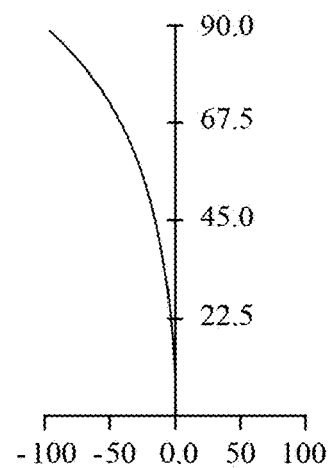
Figure 9C:
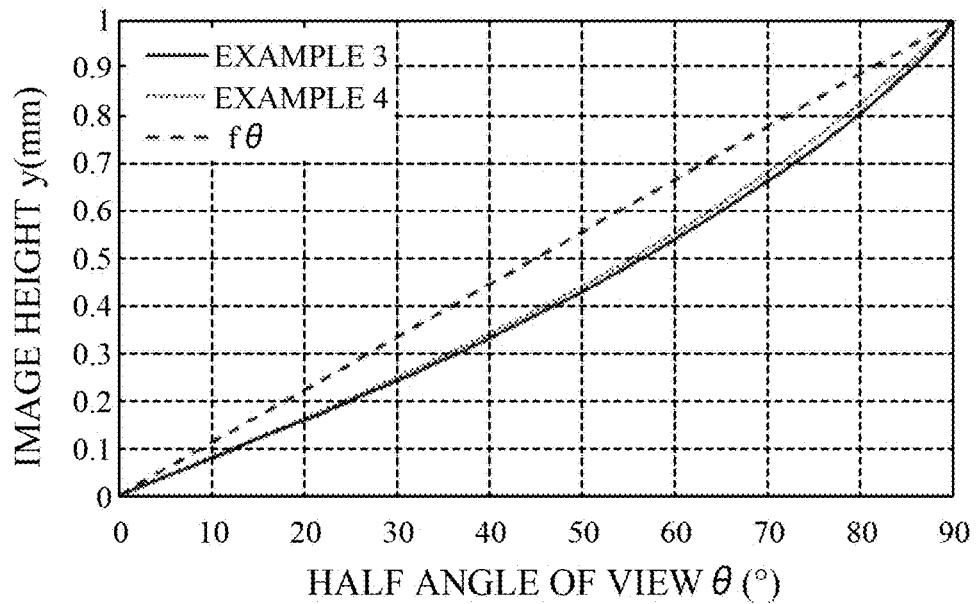

FIG. 6 illustrates the longitudinal aberration at an imaging distance of ∞ of the optical system according to this example (numerical example 3). FIG. 9C illustrates the projection characteristic of the optical system according to this example, and as described above, and FIG. 10C illustrates the θ-resolution characteristic of the optical system according to this example.

Example 4

Figure 7:
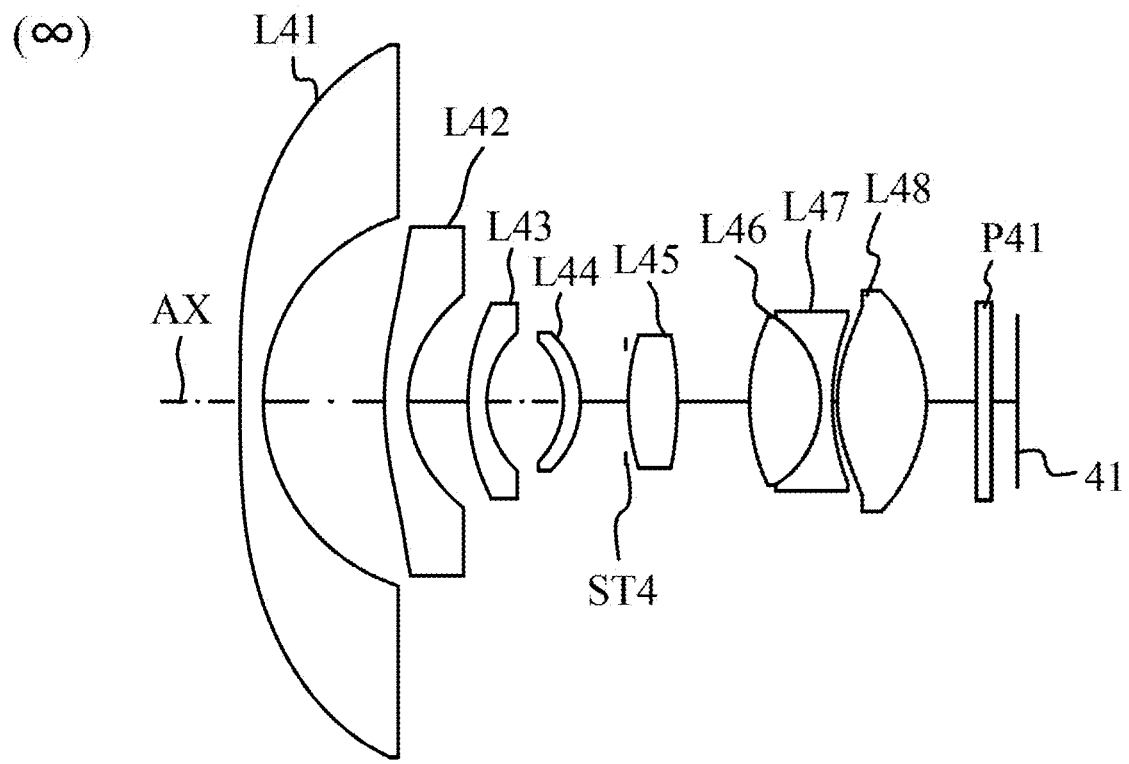
FIG. 7 is a cross-sectional view of an optical system according to Example 4.

FIG. 7 illustrates the configuration of the optical system (imaging distance of ∞) according to Example 4. The optical system according to this example includes, in order from the object side to the image side, a first lens L41 having negative refractive power, a second lens L42 having negative refractive power, a third lens L43 having negative refractive power, a fourth lens L44 having negative refractive power, an aperture stop ST4, a fifth lens L45 having positive refractive power, a sixth lens L46 having positive refractive power, a seventh lens L47 having negative refractive power, and an eighth lens L48 having positive refractive power. In FIG. 7, P41 is a flat plate such as an IR cut filter, and reference numeral 41 is an image sensor.

As can be seen from numerical example 4 corresponding to this example illustrated in Table 4, the optical system according to this example has an F-number of 1.80, which is brighter than that of Example 1 (2.80), and satisfies the value of inequality (1) is 0.92, which is larger than that of Example 1 (0.78).

The optical system according to this example (numerical example 4) satisfies inequalities (1) to (4). Table 5 summarizes the values for each inequality.

Figure 8:
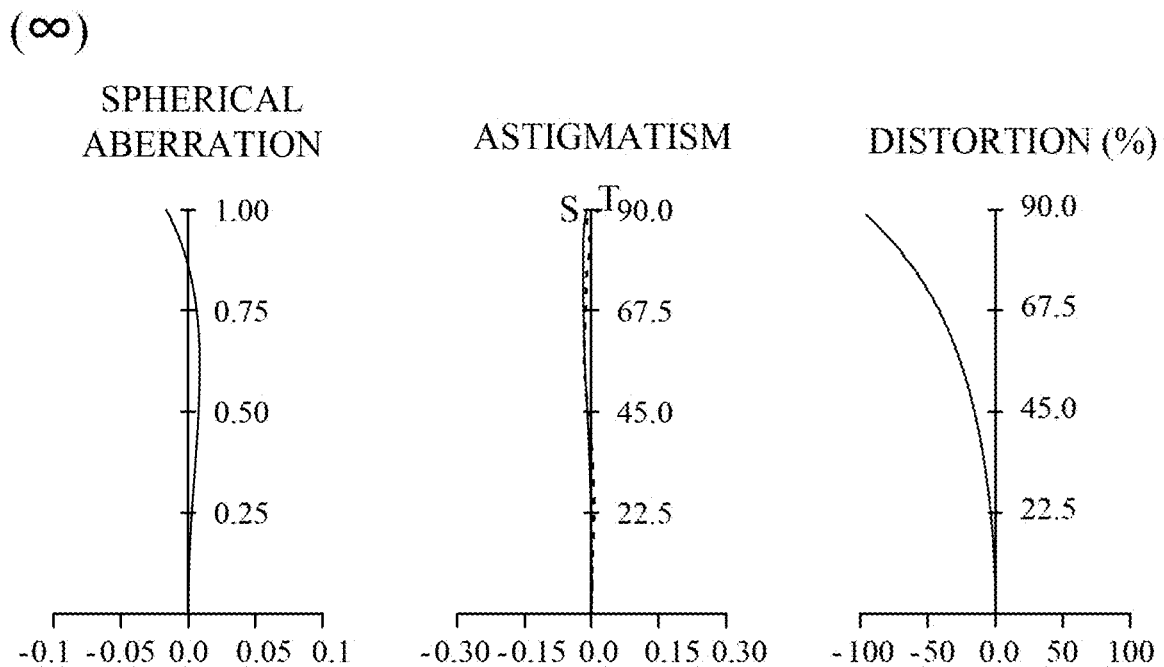
FIG. 8 is an aberration diagram at an imaging distance of co of the optical system according to Example 4.

FIG. 8 illustrates the longitudinal aberration at the imaging distance co of the optical system according to this example (numerical example 4). FIG. 9C illustrates the projection characteristics of the optical system of this example, and as described above, and FIG. 10C illustrates the θ-resolution characteristics of the optical system according to this example.

TABLE 1

NUMERICAL EXAMPLE 1

(A) LENS CONFIGURATION

| | | |
|---|---|---|
| f (FOCAL LENGTH) | | 1.42 mm |
| F (APERTURE RATIO) | | 2.80 |
| MAXIMUM HALF ANGLE OF VIEW | | 90.0° |

| | | | | |
|---|---|---|---|---|
|   | r1 = 17.48 | d1 = 1.00 | n1 = 1.868 | ν1 = 41.7 |
|   | r2 = 8.00 | d2 = 3.43 | | |
| * | r3 = 44.02 | d3 = 1.00 | n2 = 1.498 | ν2 = 68.4 |
| * | r4 = 7.51 | d4 = 2.75 | | |
|   | r5 = 7.23 | d5 = 0.60 | n3 = 1.767 | ν3 = 49.8 |
|   | r6 = 2.15 | d6 = 2.06 | | |
| * | r7 = −9.32 | d7 = 2.24 | n4 = 1.851 | ν4 = 40.1 |
|   | r8 = −4.60 | d8 = 0.81 | | |
| ST | r9 = ∞ | d9 = 0.82 | | |
|   | r10 = −16.21 | d10 = 0.71 | n5 = 1.742 | ν5 = 25.7 |
|   | r11 = −4.05 | d11 = 1.14 | | |
|   | r12 = 158.10 | d12 = 1.44 | n6 = 1.694 | ν6 = 52.6 |
|   | r13 = −2.26 | d13 = 0.24 | n7 = 1.922 | ν7 = 20.8 |
|   | r14 = 13.82 | d14 = 0.10 | | |
| * | r15 = 7.74 | d15 = 2.79 | n8 = 1.583 | ν8 = 59.4 |
| * | r16 = −2.78 | d16 = 2.10 | | |
|   | r17 = ∞ | d17 = 0.65 | n9 = 1.516 | ν9 = 64.1 |

(B) ASPHERIC COEFFICIENT

| | K | A | B | C |
|---|---|---|---|---|
| r3 | 0 | 1.380E−03 | −2.469E−05 | 3.957E−07 |
| r4 | 0 | −3.975E−04 | 1.727E−05 | −5.901E−07 |
| r7 | 0 | −5.784E−03 | 5.098E−04 | −1.431E−04 |
| r15 | −1.777E−10 | −4.898E−03 | 3.008E−04 | −8.430E−06 |
| r16 | −1.566E+00 | −1.758E−03 | −2.258E−04 | −1.643E−06 |

| | D | E | F | G |
|---|---|---|---|---|
| r3 | −2.087E−09 | 0 | 0 | 0 |
| r4 | 2.886E−09 | 0 | 0 | 0 |
| r7 | 1.201E−05 | 2.842E−07 | 0 | 0 |
| r15 | 1.288E−07 | −1.117E−09 | 5.174E−12 | −9.931E−15 |
| r16 | 5.691E−08 | 5.709E−08 | −2.467E−09 | 2.799E−11 |

TABLE 2

NUMERICAL EXAMPLE 2

(A) LENS CONFIGURATION

| | | |
|---|---|---|
| f (FOCAL LENGTH) | | 1.30 mm |
| F (APERTURE RATIO) | | 2.80 |
| MAXIMUM HALF ANGLE OF VIEW | | 60.0° |

| | | | | |
|---|---|---|---|---|
| * | r1 = 20.40 | d1 = 1.50 | n1 = 1.789 | ν1 = 47.9 |
| * | r2 = 8.01 | d2 = 2.18 | | |
|   | r3 = 8.94 | d3 = 1.23 | n2 = 1.770 | ν2 = 48.9 |
|   | r4 = 2.38 | d4 = 2.14 | | |
| * | r5 = −18.79 | d5 = 2.35 | n3 = 1.851 | ν3 = 40.1 |
| * | r6 = −63.71 | d6 = 0.38 | | |
|   | r7 = 5.12 | d7 = 1.96 | n4 = 1.611 | ν4 = 34.6 |
| ST | r8 = −10.26 | d8 = 1.40 | | |
|   | r9 = −154.62 | d9 = 1.78 | n5 = 1.666 | ν5 = 54.0 |
|   | r10 = −2.35 | d10 = 0.40 | n6 = 1.895 | ν6 = 21.3 |
|   | r11 = −56.68 | d11 = 0.10 | | |
| * | r12 = 5.18 | d12 = 4.54 | n7 = 1.583 | ν7 = 59.4 |
| * | r13 = −1.79 | d13 = 1.00 | | |
|   | r14 = ∞ | d14 = 0.65 | n8 = 1.516 | ν8 = 64.1 |
|   | r15 = ∞ | d15 = 1.10 | | |

(B) ASPHERIC COEFFICIENT

| | K | A | B | C |
|---|---|---|---|---|
| r1 | 0 | 3.794E−04 | −3.428E−06 | −1.765E−09 |
| r2 | 0 | −9.885E−04 | 1.577E−05 | −1.506E−07 |

TABLE 2-continued

NUMERICAL EXAMPLE 2

|     | K | A | B | C |
| --- | --- | --- | --- | --- |
| r5  | 0 | 3.653E−03 | −1.060E−04 | −6.700E−05 |
| r6  | 0 | 3.105E−05 | −2.642E−04 | −9.134E−05 |
| r12 | −4.884E−01 | −5.567E−03 | 3.275E−04 | −9.070E−06 |
| r13 | −2.445E+00 | −6.647E−03 | 1.385E−03 | −2.008E−04 |

|     | D | E | F | G |
| --- | --- | --- | --- | --- |
| r1  | 4.845E−10 | 0 | 0 | 0 |
| r2  | −1.088E−10 | 0 | 0 | 0 |
| r5  | 3.041E−06 | 1.388E−06 | 0 | 0 |
| r6  | 3.857E−05 | −4.037E−06 | 0 | 0 |
| r12 | 1.374E−07 | −1.218E−09 | 6.168E−12 | −1.415E−14 |
| r13 | 1.624E−05 | −6.596E−07 | 1.281E−08 | −9.506E−11 |

TABLE 3

NUMERICAL EXAMPLE 3

(A) LENS CONFIGURATION

| f (FOCAL LENGTH) | 0.80 mm |
| --- | --- |
| F (APERTURE RATIO) | 2.00 |
| MAXIMUM HALF ANGLE OF VIEW | 90.0° |

|   |   |   |   |   |
| --- | --- | --- | --- | --- |
|   | r1 = 19.24 | d1 = 1.20 | n1 = 1.883 | ν1 = 40.8 |
|   | r2 = 9.00 | d2 = 5.16 |   |   |
| * | r3 = 45.70 | d3 = 1.00 | n2 = 1.883 | ν2 = 40.8 |
| * | r4 = 7.03 | d4 = 3.06 |   |   |
|   | r5 = 18.85 | d5 = 0.50 | n3 = 1.774 | ν3 = 49.5 |
|   | r6 = 2.86 | d6 = 1.59 |   |   |
| * | r7 = −7.87 | d7 = 0.48 | n4 = 1.851 | ν4 = 40.1 |
| * | r8 = 127.24 | d8 = 2.12 |   |   |
| ST | r9 = ∞ | d9 = 0.85 |   |   |
|   | r10 = 13.04 | d10 = 0.66 | n5 = 1.871 | ν5 = 21.8 |
|   | r11 = −7.20 | d11 = 2.67 |   |   |
|   | r12 = 7.65 | d12 = 1.38 | n6 = 1.698 | ν6 = 52.4 |
|   | r13 = −2.40 | d13 = 0.48 | n7 = 1.922 | ν7 = 20.8 |
|   | r14 = 9.84 | d14 = 0.10 |   |   |
| * | r15 = 4.78 | d15 = 1.86 | n8 = 1.583 | ν8 = 59.4 |
| * | r16 = −2.92 | d16 = 1.21 |   |   |
|   | r17 = ∞ | d17 = 0.95 | n9 = 1.560 | ν9 = 56.0 |
|   | r18 = ∞ | d18 = 1.64 |   |   |
|   | r19 = ∞ | d19 = 0.30 | n10 = 1.500 | ν10 = 63.0 |
|   | r20 = ∞ | d20 = 0.10 |   |   |

(B) ASPHERIC COEFFICIENT

|     | K | A | B | C |
| --- | --- | --- | --- | --- |
| r3  | 0 | 1.227E−03 | −2.336E−05 | 3.436E−07 |
| r4  | 0 | −3.097E−04 | 1.607E−05 | −6.544E−07 |
| r7  | 0 | −1.228E−02 | 5.124E−04 | −2.807E−05 |
| r8  | 0 | −4.179E−03 | 3.391E−04 | 7.445E−05 |
| r15 | −1.777E−10 | −5.342E−03 | 1.716E−04 | −3.133E−06 |
| r16 | −2.039E+00 | −2.201E−03 | −1.905E−04 | −5.068E−06 |

|     | D | E | F | G |
| --- | --- | --- | --- | --- |
| r3  | −1.388E−09 | 0 | 0 | 0 |
| r4  | 1.030E−09 | 0 | 0 | 0 |
| r7  | 4.846E−05 | 7.157E−07 | 0 | 0 |
| r8  | 7.554E−05 | 1.622E−06 | 0 | 0 |
| r15 | 3.322E−08 | −2.118E−10 | 7.829E−13 | −1.317E−15 |
| r16 | 2.725E−06 | −1.297E−07 | 2.092E−09 | −9.425E−12 |

TABLE 4

NUMERICAL EXAMPLE 4

(A) LENS CONFIGURATION

| f (FOCAL LENGTH) | 1.68 mm |
|---|---|
| F(APERTURE RATIO) | 1.80 |
| MAXIMUM HALF ANGLE OF VIEW | 90.0° |

| | | | | |
|---|---|---|---|---|
| * | r1 = 137.12 | d1 = 1.00 | n1 = 1.851 | v1 = 40.1 |
|  | r2 = 8.22 | d2 = 5.13 |  |  |
| * | r3 = 14.98 | d3 = 1.00 | n2 = 1.583 | v2 = 59.4 |
| * | r4 = 5.10 | d4 = 2.55 |  |  |
|  | r5 = 9.11 | d5 = 0.80 | n3 = 1.516 | v3 = 64.1 |
|  | r6 = 3.97 | d6 = 3.28 |  |  |
|  | r7 = −3.56 | d7 = 0.71 | n4 = 1.516 | v4 = 64.1 |
|  | r8 = −4.02 | d8 = 1.93 |  |  |
| ST | r9 = ∞ | d9 = 0.10 |  |  |
|  | r10 = 9.23 | d10 = 2.10 | n5 = 1.673 | v5 = 32.1 |
|  | r11 = −13.90 | d11 = 3.04 |  |  |
|  | r12 = 8.45 | d12 = 3.03 | n6 = 1.703 | v6 = 52.4 |
|  | r13 = −4.26 | d13 = 0.50 | n7 = 1.923 | v7 = 20.9 |
|  | r14 = 9.75 | d14 = 0.20 |  |  |
| * | r15 = 5.85 | d15 = 3.79 | n8 = 1.583 | v8 = 59.4 |
| * | r16 = −5.37 | d16 = 2.10 |  |  |
|  | r17 = ∞ | d17 = 0.65 | n9 = 1.516 | v9 = 64.1 |
|  | r18 = ∞ | d18 = 1.10 |  |  |

(B) ASPHERIC COEFFICIENT

|  | K | A | B | C |
|---|---|---|---|---|
| r3 | 0 | 1.993E−04 | −1.433E−06 | 8.854E−09 |
| r4 | 0 | −9.495E−06 | −1.551E−05 | 2.363E−07 |
| r7 | 0 | −3.736E−04 | 9.804E−06 | −7.118E−07 |
| r15 | −1.777E−10 | −2.345E−03 | 8.789E−05 | −8.009E−06 |
| r16 | −6.509E+00 | −2.507E−03 | 2.378E−04 | −1.752E−05 |

|  | D | E | F | G |
|---|---|---|---|---|
| r3 | −3.173E−11 | 5.492E−14 | 0 | 0 |
| r4 | −7.758E−10 | 0 | 0 | 0 |
| r7 | −5.323E−08 | 0 | 0 | 0 |
| r15 | 2.916E−07 | −4.676E−09 | 3.446E−11 | −9.581E−14 |
| r16 | 5.855E−07 | −9.714E−09 | 7.901E−11 | −2.521E−13 |

TABLE 5

VALUES OF INEQUALITIES

| INEQUALITY | EXAMPLE 1 | EXAMPLE 2 | EXAMPLE 3 | EXAMPLE 4 |
|---|---|---|---|---|
| (1) | 0.78 | 0.41 | 0.89 | 0.92 |
| (2) | 1.65 | 2.09 | 1.55 | 1.45 |
| (3) | 0.39 | 0.31 | 0.45 | 0.46 |
| (4)(θmax) | 90° | 60° | 90° | 90° |
| y(θmax) | 3.64 | 3.65 | 1.79 | 3.64 |

Figure 17:
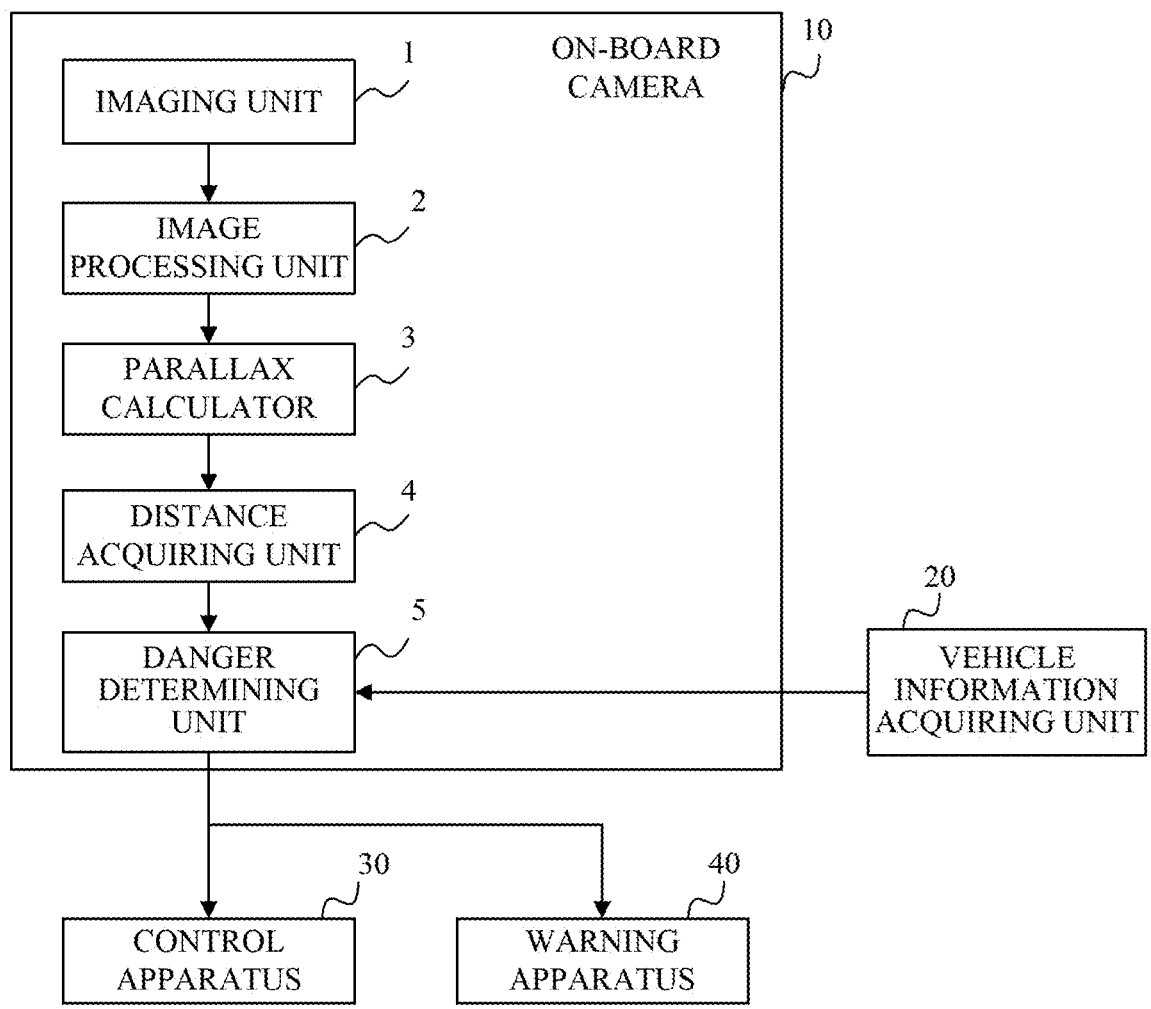
FIG. 17 is a block diagram illustrating the configuration of an on-board system.

FIG. 17 illustrates the configuration of an on-board system (driving support apparatus) 600 as the above E-mirror (image pickup system). The on-board system 600 described here is a system for supporting driving (maneuvering) of a vehicle based on image data of the rear, lower, and lower front views of the vehicle acquired by the image pickup apparatus 10.

The on-board system 600 includes an image pickup apparatus (on-board camera) 10, a vehicle information acquiring apparatus 20, a control apparatus (control unit; ECU: electronic control unit) 30, and a warning apparatus (warning unit) 40. The image pickup apparatus 10 includes an imaging unit 1 including an optical system and an image sensor, an image processing unit 2, a parallax calculator 3, a distance acquiring unit (acquiring unit) 4, and a danger determining unit 5. The imaging unit 1 is provided on each of the left and right sides of the vehicle. The image processing unit 2, the parallax calculator 3, the distance acquiring unit 4, and the danger determining unit 5 constitute a processing unit.

Figure 18:
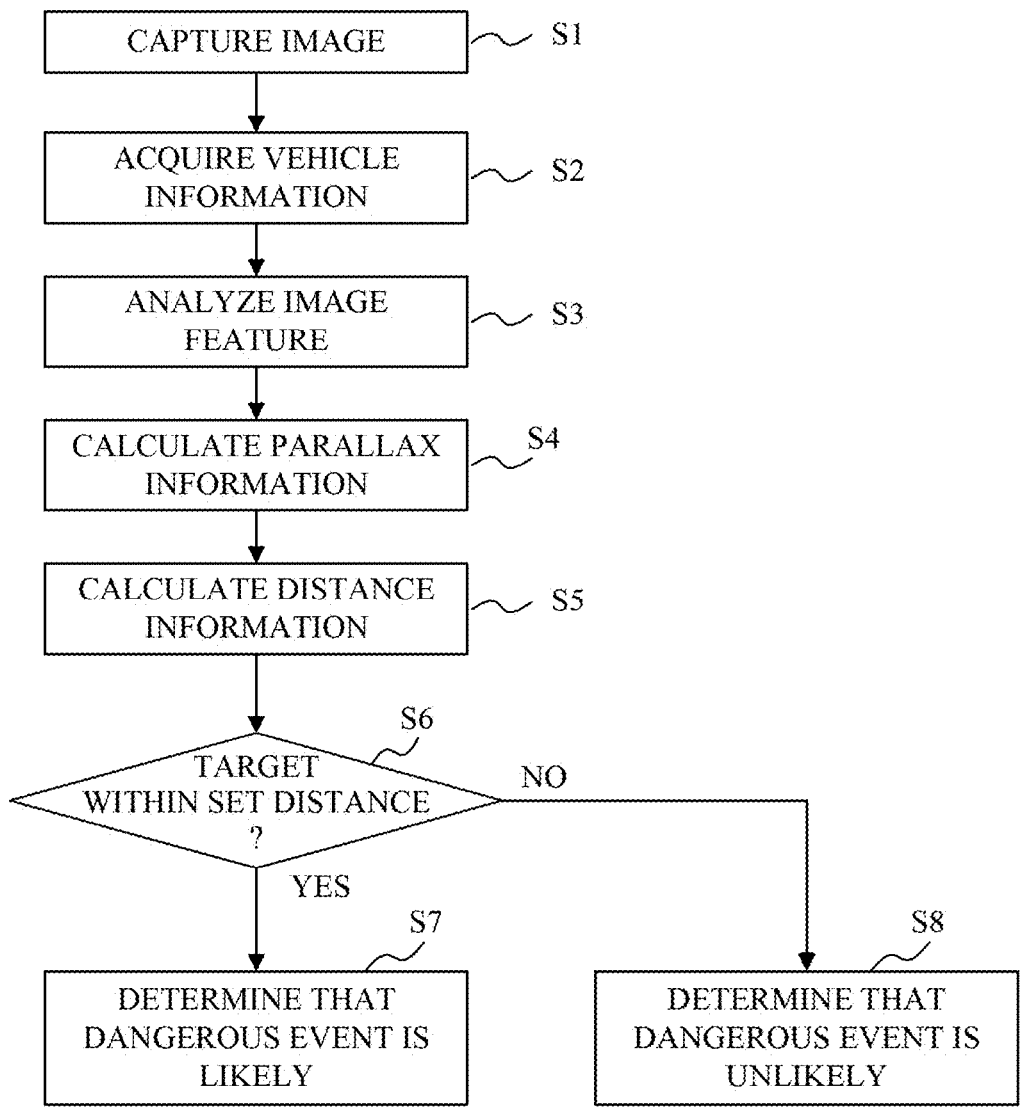
FIG. 18 is a flowchart illustrating an operation example of the on-board system.

A flowchart in FIG. 18 illustrates an operation example of the on-board system 600. First, in step S1, the imaging unit 1 images an object such as an obstacle and a pedestrian behind, below, and at the lower front of the vehicle to obtain a captured image (image data).

In step S2, the vehicle information acquiring apparatus 20 acquires vehicle information. The vehicle information is information including a vehicle speed, a yaw rate, a steering angle, etc.

In step S3, the image processing unit 2 performs image processing for the image data acquired by the imaging unit 1. More specifically, image feature analysis is performed to analyze a feature amount such as an amount and direction of an edge and a density value in the image data.

In step S4, the parallax calculator 3 calculates parallax (image shift) information between a plurality of image data acquired by the imaging unit 1. A method for calculating the parallax information can use a known method such as the SSDA method and the area correlation method, and thus a description thereof will be omitted here. Steps S2, S3, and S4 may be performed in the above order or may be performed in parallel.

In step S5, the distance acquiring unit 4 acquires (calculates) distance information from the object imaged by the imaging unit 1. The distance information can be calculated based on the parallax information calculated by the parallax calculator 3 and the internal parameters and external parameters of the imaging unit 1. The distance information here refers to information about a relative position to the object, such as a distance to the object, a defocus amount, and an image shift amount, and the distance to the object may also be directly or indirectly expressed.

Then, in step S6, the danger determining unit 5 determines whether the distance to the object is included in a set distance range using the vehicle information acquired by the vehicle information acquiring apparatus 20 and the distance information calculated by the distance acquiring unit 4. Thereby, it can be determined whether an object exists within the set distance behind the vehicle, and whether a dangerous event is likely such as a collision with a diagonally rear vehicle in changing lanes, a front wheel falling into a ditch, or running onto a sidewalk. The danger determining unit 5 determines "dangerous" if the object exists within the set distance and the dangerous event (step S7) is likely, and determines "not dangerous" (step S8) if the object does not exist within the set distance.

Next, in a case where the danger determining unit 5 determines "dangerous," it notifies (sends) the determination result to the control apparatus 30 and warning apparatus 40. At this time, the control apparatus 30 controls the vehicle based on the determination result of the danger determining unit 5 (step S6), and the warning apparatus 40 warns the vehicle user (driver, passenger) based on the determination result of the danger determining unit 5 (step S7). The determination result may be notified to at least one of the control apparatus 30 and the warning apparatus 40.

In the case of "dangerous," the control apparatus 30 controls the vehicle, such as returning the steering wheel so as not to change lanes, not to fall into a ditch or not to run onto a sidewalk, or to generate a braking force on the wheels. The warning apparatus 40 issues a warning to the user, such as by emitting a warning sound (alarm), displaying warning information on a screen of a car navigation system, or applying vibration to a seat belt or steering wheel.

There are various methods for calculating distance information. For example, a case will be described in which a pupil division type image sensor having a plurality of pixel portions arranged in a two-dimensional array is used as the image sensor included in the imaging unit 1. In the pupil division type image sensor, a single pixel unit includes a microlens and a plurality of photoelectric converters, receives a pair of light beams passing through different areas in the pupil of the optical system, and can output a pair of image data from each photoelectric converter.

An image shift amount in each area is calculated by correlation calculation between the paired image data, and the distance acquiring unit 4 calculates image shift map data representing a distribution of the image shift amount. The distance acquiring unit 4 may further convert the image shift amount into a defocus amount and generate the defocus map data representing the distribution of the defocus amount (distribution on a two-dimensional plane of a captured image). Further, the distance acquiring unit 4 may acquire distance map data of the distance to the target converted from the defocus amount.

The on-board system 600 may include a notifying apparatus (notifying unit) for notifying the manufacturer of the on-board system, the vehicle seller (dealer), etc., if a dangerous event such as a collision actually occurs. For example, the notifying apparatus may be one that transmits information about a dangerous event to a preset external notification destination via e-mail or the like.

Thus, the configuration in which the notifying apparatus automatically notifies information on a dangerous event can promptly take measures such as inspection and repair after the dangerous event occurs. The notification destination of the dangerous event information may be an insurance company, a medical institution, the police, or an arbitrary notification destination set by the user.

This example applies the on-board system 600 to driving support (collision damage reduction), but the on-board system 600 is not limited to this and can be used for cruise control (including adaptive cruise control function) and automatic driving etc. An image pickup system having a configuration equivalent with that of the on-board system 600 may be mounted on a movable body such as an aircraft, a ship, or even an industrial robot.

In the above examples, the lens apparatus is applied to the image pickup apparatus 10 as a distance measuring apparatus, but may be applied to an image pickup apparatus (on-board camera) other than a distance measuring apparatus. For example, an on-board camera may be placed at the rear or side of the vehicle, and the acquired image information may be displayed on a display unit (monitor) inside the vehicle to provide driving assistance. In this case, it is not necessary to provide a component for distance measurement, such as a parallax calculator, a distance acquiring unit, and a collision determining unit.

In the above examples, the lens apparatus is applied to an imaging unit in an on-board system, but this embodiment is not limited to these examples. For example, the lens apparatus may be applied to an image pickup apparatus such as a digital still camera, a digital video camera, or a film-based camera, or may be applied to an optical apparatus such as a telescope or a projection apparatus such as a projector.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an image pickup system that can secure a sufficient angle of view and high resolution in a peripheral area using a single optical system.

What is claimed is:

1. An image pickup system comprising an image pickup apparatus mounted on a movable body,
wherein the image pickup apparatus includes an optical system and an image sensor configured to image an object via the optical system,
wherein an imaging surface of the image sensor has a first area for imaging an object included in a first angle of view, and a second area for imaging an object included in a second angle of view larger than the first angle of view,
wherein the number of pixels per unit angle of view in the second area is larger than the number of pixels per unit angle of view in the first area,
wherein in a case where the movable body moves in a horizontal direction, the image pickup apparatus is installed so that an optical axis of the optical system is nonparallel to the horizontal direction, and
wherein the optical system satisfies the following inequalities:

$$55° \leq \theta max$$

$$20\% < |d\theta max|$$

where θmax is a maximum half angle of view, and dθmax is a distortion amount at a position corresponding to a maximum image height of the optical system.

2. The image pickup system according to claim 1, wherein in a case where the movable body moves in the horizontal direction, the image pickup apparatus is installed so that the optical axis is parallel to a vertical direction when viewed from the moving direction of the movable body.

3. The image pickup system according to claim 1, wherein in a case where the movable body moves in the horizontal direction, the image pickup apparatus is installed so that the optical axis is tilted toward a side away from the movable body relative to a vertical direction when viewed from the moving direction of the movable body.

4. The image pickup system according to claim 1, wherein in a case where the movable body moves in the horizontal direction, the image pickup apparatus is installed so as to image an object on a lower side in a vertical direction relative to the optical system.

5. The image pickup system according to claim 1, wherein when viewed from the horizontal direction as a first direction, the optical system satisfies the following inequality:

$$0° \leq \theta L \leq 20°$$

where θL is an angle between the optical axis and a vertical direction as a second direction.

6. The image pickup system according to claim 1, wherein the optical system is disposed so that the optical axis is shifted toward a side away from the movable body in a third direction orthogonal to the first and second directions with respect to a center of the imaging surface.

7. The image pickup system according to claim 6, wherein the optical system satisfies the following inequality:

$$0.3Ls \leq La \leq 0.5Ls$$

where La is a shift amount of the optical axis from the center of the imaging surface, and Ls is a length of a side of the imaging surface extending in a direction from the center of the imaging surface toward the optical axis.

8. The image pickup system according to claim 6, wherein in a case where the movable body moves in the horizontal direction, when viewed from a moving direction of the movable body, the optical system satisfies the following inequality:

$$0.3Ls \leq La + y\alpha \leq 0.5Ls$$

where α is an angle between the optical axis and a first straight line connecting an intersection of a surface closest to an object of the optical system and the optical axis, and an endpoint of the movable body in a vertical direction, yα is a distance from an intersection of the first straight line and the imaging surface to the optical axis, La is a shift amount of the optical axis from the center of the imaging surface, and Ls is a length of a side of the imaging surface extending in a direction from the center of the imaging surface toward the optical axis.

9. The image pickup system according to claim 1, wherein in a case where the movable body moves in the horizontal direction, when viewed from a direction orthogonal to a moving direction of the movable body and a vertical direction, the optical system satisfies the following inequality:

$$\theta max < \theta f \leq 1.3 \theta max$$

where θf is an angle formed between the optical axis and a straight line connecting an intersection of a surface closest to an object of the optical system and the optical axis, and an endpoint of a front wheel of the movable body in the moving direction in the second angle of view.

10. The image pickup system according to claim 1, wherein in a case where the movable body moves in the horizontal direction, when viewed from a third direction orthogonal to a moving direction of the movable body and a vertical direction, the optical system satisfies the following inequality:

$$0.5Lh < Lf \leq 0.65Lh$$

where Lf is a distance between an image point at an endpoint image point of a front wheel of the movable body in the moving direction at the second angle of view and a center of the imaging surface, and Lh is a length of a side of the imaging surface extending in a direction from the center of the imaging surface toward the image point.

11. The image pickup system according to claim 1, further comprising a display unit configured to display image data generated using an output from the image sensor.

12. The image pickup system according to claim 1, further comprising a processing unit configured to process image information acquired by the image pickup apparatus.

13. The image pickup system according to claim 12, further comprising a determining unit configured to determine whether a dangerous event is likely based on distance information to the object acquired by the image pickup apparatus.

14. The image pickup system according to claim 13, further comprising a control apparatus configured to control the movable body in a case where it is determined that the dangerous event is likely.

15. The image pickup system according to claim 13, further comprising a warning apparatus configured to issue a warning to a user of the movable body in a case where it is determined that the dangerous event is likely.

16. The image pickup system according to claim 13, further comprising a notifying apparatus configured to notify outside of information about the dangerous event.

17. A movable body comprising the image pickup system according to claim 1.

* * * * *